(12) United States Patent
Schwartz et al.

(10) Patent No.: US 11,667,803 B2
(45) Date of Patent: Jun. 6, 2023

(54) CURABLE HIGH REFRACTIVE INDEX INK COMPOSITIONS AND ARTICLES PREPARED FROM THE INK COMPOSITIONS

(71) Applicant: 3M INNOVATIVE PROPERTIES COMPANY, St. Paul, MN (US)

(72) Inventors: Evan L. Schwartz, Vadnais Heights, MN (US); Claire Hartmann-Thompson, Lake Elmo, MN (US); Sonja S. Mackey, St. Paul, MN (US); Wayne S. Mahoney, St. Paul, MN (US); Saswata Chakraborty, Cottage Grove, MN (US); Kelly A. Volp, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 425 days.

(21) Appl. No.: 16/631,201

(22) PCT Filed: Jul. 23, 2018

(86) PCT No.: PCT/US2018/043231
§ 371 (c)(1),
(2) Date: Jan. 15, 2020

(87) PCT Pub. No.: WO2019/023096
PCT Pub. Date: Jan. 31, 2019

(65) Prior Publication Data
US 2020/0216697 A1  Jul. 9, 2020

Related U.S. Application Data

(60) Provisional application No. 62/537,121, filed on Jul. 26, 2017.

(51) Int. Cl.
*C09D 11/101* (2014.01)
*C08K 9/06* (2006.01)
(Continued)

(52) U.S. Cl.
CPC ............... *C09D 11/38* (2013.01); *C08K 3/22* (2013.01); *C08K 9/06* (2013.01); *C08L 71/02* (2013.01);
(Continued)

(58) Field of Classification Search
CPC ............................. C08K 9/06; C09D 11/101
See application file for complete search history.

(56) References Cited

U.S. PATENT DOCUMENTS 6,656,990 B2    12/2003  Shustack
7,104,642 B2 *   9/2006  Takabayashi ........ C09D 11/101
                                                347/100

(Continued)

FOREIGN PATENT DOCUMENTS

WO   WO-2015108834 A1 *  7/2015  ............... C08J 7/18
WO   WO 2017-065641       4/2017
WO   WO 2018-122748       7/2018

OTHER PUBLICATIONS

Kim et al., Journal of Information Display, vol. 7, No. 3, 2006, pp. 13-18.*

(Continued)

*Primary Examiner* — Vu A Nguyen
(74) *Attorney, Agent, or Firm* — Jeffrey M. Olofson

(57) ABSTRACT

Curable ink compositions include a curable aromatic monomer composition, and surface treated metal oxide nanoparticles. The surface treated metal oxide nanoparticles are surface treated with a mixture of at least two silane-functional surface treatment agents, at least one aromatic-containing silane-functional surface treatment agent and at least (Continued)

one silane-functional surface treatment agent comprising a co-polymerizable group. The curable ink composition is inkjet printable, having a viscosity of 30 centipoise or less at a temperature of from room temperature to 60° C., and is free from solvents. The curable ink composition, when printed and cured, has a refractive index of 1.55 or greater, and is optically clear.

9 Claims, 1 Drawing Sheet

(51) Int. Cl.
    *C08K 3/22*     (2006.01)
    *C09D 11/38*     (2014.01)
    *C08L 71/02*     (2006.01)
    *G02B 1/111*     (2015.01)

(52) U.S. Cl.
    CPC ...... *G02B 1/111* (2013.01); *C08K 2003/2241* (2013.01); *C08K 2201/011* (2013.01)

(56) References Cited

U.S. PATENT DOCUMENTS

| | | | |
|---|---|---|---|
| 7,241,437 | B2 | 7/2007 | Davidson |
| 8,518,473 | B2 | 8/2013 | Tao |
| 9,284,419 | B2 | 3/2016 | Doshi |
| 9,403,300 | B2 | 8/2016 | Kolb |
| 2006/0182901 | A1* | 8/2006 | Takagi ............... B29C 55/005 428/1.31 |
| 2007/0196657 | A1 | 8/2007 | Bhandarkar |
| 2009/0220770 | A1 | 9/2009 | Ueno |
| 2012/0010361 | A1* | 1/2012 | Urakawa ................ C08F 2/44 524/730 |
| 2014/0370307 | A1 | 12/2014 | Hao |
| 2015/0203708 | A1 | 7/2015 | Klun |
| 2015/0349295 | A1 | 12/2015 | Boesch |

OTHER PUBLICATIONS

Computer-generated English-language translation of JP2013203828A.*
Chwang, "Thin Film Encapsulated Flexible Organic Electroluminescent Displays" Applied Physics Letters, 2003, vol. 83, No. 3, pp. 413-415.
Martin, "Identifying the Ideal Characteristics of the Grafted Polymer Chain Length Distribution for Maximizing Dispersion of Polymer Grafted Nanoparticles in a Polymer Matrix", Macromolecules, Nov. 2013, vol. 46, No. 22, pp. 9144-9150.
Saxena, "A Review on the Light Extraction Techniques in Organic Electroluminescent Devices", Optical Materials, November Jul. 2009, vol. 32, No. 1, pp. 221-233.
International Search Report for PCT International Application No. PCT/US2018/043231, dated Oct. 11, 2018, 4 pages.
Ecological Processing Technology For Textile, New Textile Technology Library, Fang Kuanjun.
Frontiers of Physics and High Technology, Guangxi Nationalities Publishing House, Jiang Shiliang.
Xue Chaohua et al., Textile Digital Inkjet Printing Technology, Chemical Industry Press, 2008-ISBN 978-7-122-01486-3.

* cited by examiner

CURABLE HIGH REFRACTIVE INDEX INK COMPOSITIONS AND ARTICLES PREPARED FROM THE INK COMPOSITIONS

FIELD OF THE DISCLOSURE

This disclosure relates to curable compositions containing metal oxide nanoparticles that have a high refractive index, are printable, and can be printed and cured to form articles.

BACKGROUND

Increasingly, optical devices are becoming more complicated and involve more and more functional layers. As light travels through the layers of the optical device, the light can be altered by the layers in a wide variety of ways. For example, light can be reflected, refracted or absorbed. In many cases, layers that are included in optical devices for non-optical reasons adversely affect the optical properties. For example, if a support layer is included that is not optically clear, the absorption of light by the non-optically clear support layer can adversely affect the light transmission of the entire device.

One common difficulty with multi-layer optical devices is that when layers of differing refractive indices are adjacent to each other, refraction of light can occur at their interface. In some devices this refraction of light is desirable, but in other devices the refraction is undesirable. Also, at angles of incidence higher than a critical angle, light can be reflected at the interface between two layers. In order to minimize or eliminate this refraction or reflection of light at the interface between two layers, efforts have been made to minimize the difference in refractive index between the two layers that form the interface. However, as a wider range of materials have been employed within optical devices, the matching of refractive indices has become increasingly difficult. Organic polymer films and coatings, which are frequently used in optical devices, have a limited range of refractive indices. As higher refractive index materials are increasingly used in optical devices, it has become increasingly difficult to prepare organic polymeric compositions that have suitable optical properties, such as desirable refractive indices and optical clarity, and yet retain the desirable features of organic polymers, such as ease of processing, flexibility, and the like.

SUMMARY

Disclosed herein are curable ink compositions, articles prepared from the curable ink compositions, methods of preparing articles with the curable ink compositions, and surface-treated metal oxide nanoparticles with desirable properties for preparing the curable ink compositions. In some embodiments, the curable ink composition comprises a curable aromatic monomer composition, and surface treated metal oxide nanoparticles, where the surface treated metal oxide nanoparticles comprise metal oxide nanoparticles that have been surface treated with a mixture of at least two silane-functional surface treatment agents. The curable ink composition is inkjet printable, having a viscosity of 30 centipoise or less at a temperature of from room temperature to 60° C., and is free from solvents. The curable ink composition, when printed and cured, has a refractive index of 1.55 or greater, and is optically clear.

Also disclosed are articles, in some embodiments the articles comprise a substrate with a first major surface and a second major surface, a cured layer adjacent to at least a portion of the second major surface of the substrate, where the cured layer comprises a cured organic matrix comprising at least one aromatic (meth)acrylate and surface-treated metal oxide nanoparticles, and an inorganic barrier layer in contact with the cured layer. The surface treated metal oxide nanoparticles comprise metal oxide nanoparticles that have been surface treated with a mixture of at least two silane-functional surface treatment agents, and the cured layer has a refractive index of 1.55 or greater, and is optically clear.

Also disclosed are methods of preparing articles, the methods comprising providing a substrate with a first major surface and a second major surface, providing a curable ink composition, disposing the curable ink composition on at least a portion of the second major surface of the substrate to form a curable layer, curing the curable layer to form a cured layer, and depositing an inorganic barrier layer on the cured layer. The curable ink composition comprises a curable aromatic monomer composition, and surface treated metal oxide nanoparticles, where the surface treated metal oxide nanoparticles comprise metal oxide nanoparticles that have been surface treated with a mixture of at least two silane-functional surface treatment agents. The curable ink composition is inkjet printable, having a viscosity of 30 centipoise or less at a temperature of from room temperature to 60° C., and is free from solvents. The curable ink composition, when printed and cured, has a refractive index of 1.55 or greater, and is optically clear.

Also disclosed are surface treated metal oxide nanoparticles suitable for preparing the curable ink compositions described above, where the surface treated metal oxide nanoparticles comprise metal oxide nanoparticles with a surface treatment comprising a mixture of at least two silane-functional surface treatment agents. The at least two silane-functional surface treatment agents comprise one aromatic-containing silane-functional surface treatment agent with the general Formula I:

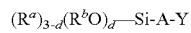

$$(R^a)_{3-d}(R^bO)_d\text{—Si-A-Y} \qquad \text{I}$$

where each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group, and at least one silane-functional surface treatment agent comprising a co-polymerizable group with the general Formula II:

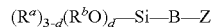

$$(R^a)_{3-d}(R^bO)_d\text{—Si—B—Z} \qquad \text{II}$$

where each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

BRIEF DESCRIPTION OF THE DRAWINGS

The present application may be more completely understood in consideration of the following detailed description of various embodiments of the disclosure in connection with the accompanying drawings.

Figure 1:
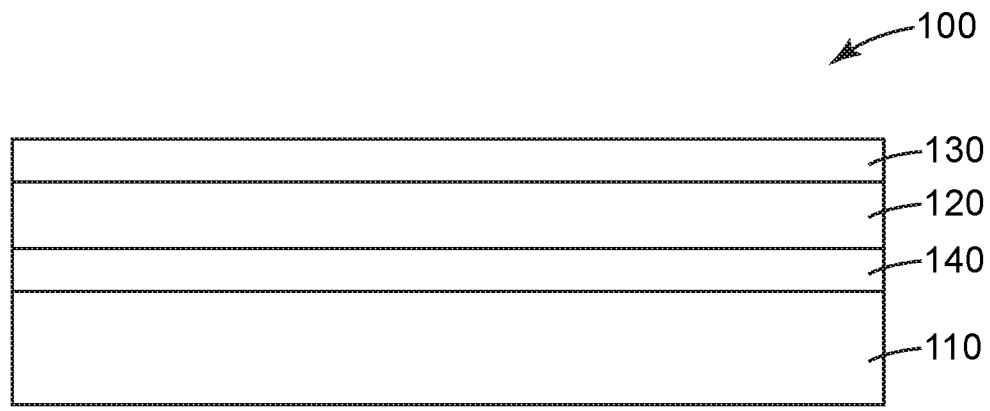
FIG. 1 is a cross sectional view of an embodiment of an article of the present disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Optical devices are becoming more and more complex, which impacts the materials used in them. In particular, organic polymeric materials have found widespread use in optical devices, however, they still must meet the stringent performance requirements.

For example, thin organic polymeric films are desirable for a wide range of uses in optical devices, as adhesives, protective layers, spacer layers, and the like. As articles have become more complex, the physical demands upon these layers have increased. For example, as optical devices have become more compact, they often include multiple layers, resulting in a growing need for thinner layers. At the same time, since the layers are thinner, the layers also need to be more precise. For example, a thin spacer layer (of 1 micrometer thickness) needs to be level and free of gaps and holes in order to provide the proper spacing function. This requires deposition of the organic layer in a precise and consistent manner.

Additionally, not only do these layers have to fulfill their physical role (adhesion, protection, spacing, and the like) they must also provide the requisite optical properties. Among the properties that are becoming increasingly important is refractive index. As light travels through the layers of a multilayer article, it encounters the interface between layers. If the refractive indices of the layers are different, light can be refracted or reflected. Therefore, to minimize this effect, matching of the refractive indices of layers within a multilayer article is desirable.

Achieving a high refractive index in a coating layer is not a trivial matter. Typically coating layers are prepared from organic polymers that typically have a refractive index that is much lower than the inorganic layers adjacent to them. Typically, organic polymers have a refractive index in the range of 1.3-1.6, whereas inorganic layers typically have a refractive index of 1.8 or higher. Specialized polymers with higher refractive indices have been developed, such as for example poly(vinyl carbazole) with an RI of 1.7, but such polymers tend to be expensive and it is generally not feasible to prepare high refractive index coating layers that include only organic polymers. Generally, inorganic nanoparticles that have a high refractive index are added to an organic polymeric matrix to raise the refractive index of the overall coating layer. Often high levels of the inorganic nanoparticles are required to achieve a high refractive index.

Coating layers that include high refractive index nanoparticles dispersed in an organic polymeric matrix have been used in a variety of optical applications. For example, in US Patent Publication No. 2014/0370307 (Hao et al.) high refractive index nanoparticles are used to form optical coupling layers.

The presence of inorganic nanoparticles, especially relatively high levels of inorganic nanoparticles makes compositions that are difficult to deliver in a precise and consistent way. Among the methods that have been developed to provide a precise and consistent deposition of organic polymeric material are printing techniques. In printing techniques, a polymer, or a curable composition that upon curing forms a polymer, is printed onto a substrate surface to form a layer. In the case of printable polymers, typically solvents are added to make the polymer a solution or dispersion capable of being printed. When solvents are used, typically a drying step is necessary after printing to produce the desired polymeric layer. In the case of curable compositions that upon curing form polymers, the curable compositions may or may not include a solvent. If a solvent is used, the layer may also be dried. The curable composition is then cured, typically either with the application of heat or radiation (such as UV light) and a suitable initiator. A wide variety of printing techniques can be used, with inkjet printing being particularly desirable because of the excellent precision on arbitrary substrate shapes and topographies. However, with the increased precision requirements for layer thickness and layer smoothness, the use of inkjet printable inks that contain solvents are less desirable, since drying of inkjet coated layers can adversely affect the layer thickness and layer smoothness, and solvent can have deleterious effects upon the substrate. Solvents are becoming increasingly disfavored for environmental and economic reasons, as solvent-borne compositions require extra precautions in handling and in drying.

An example of an optical device that utilizes thin film layers are OLED (organic light-emitting diode) devices. In particular, the organic light-emitting diode devices are susceptible to degradation from the permeation of certain liquids and gases, such as water vapor and oxygen. To reduce permeability to these liquids and gases, barrier coatings are applied to the OLED device, which is known in the art as thin film encapsulation. Typically, these barrier coatings are inorganic coatings with a high refractive index. They are not used alone, instead a barrier stack is used which can include multiple dyads. Dyads are two layer structures that include a barrier layer and decoupling layer. The decoupling layer provides a planarized and/or smooth surface for the deposition of the inorganic barrier layer.

US Patent Publication No. 2015/0349295 (Boesch et al.) describes devices that utilize dyads as barrier coatings where the dyads include a first layer (decoupling layer) that is an organic-inorganic hybrid material and the second layer is an inorganic barrier layer. The organic-inorganic hybrid decoupling layer includes an organic matrix with either an organometallic polymer or inorganic nanoparticles such that the inorganic material raises the refractive index to better match the inorganic barrier layer refractive index.

However, the organic-inorganic hybrid materials used in US Patent Publication No. 2015/0349295 are not printable. Therefore, the coating methods suitable for use with these materials is limited.

In this disclosure, curable inks that are capable of being printed are described that have a number of traits that make them suitable for the formation of layers within multilayer optical devices. Many of these traits are contradictory to each other, and therefore it is unexpected that an ink composition can combine these contradictory traits. For example, the formulations, when cured, have a relatively high refractive index of greater than 1.55. To achieve this high refractive index, the printing inks include a curable aromatic monomer composition and surface treated metal oxide nanoparticles. However, in order to be printable, especially for inkjet printing, the viscosity cannot be too high, otherwise the microscopic nozzles on the printheads can become clogged. Often this viscosity problem can be overcome through the use of solvents to dilute the monomer mixtures and thus reduce their viscosity. The use of solvents is not suitable for the curable inks of the present disclosure because it is undesirable to have to dry the prepared coatings, solvents may migrate into the OLED device stack and lead to poor device lifetime, and drying defects are known to adversely affect the surface smoothness, which is an important attribute for thin film encapsulation applications. In many applications for optical devices, it is desired that the coatings do not lose thickness or smoothness upon drying. Therefore, the curable inks of the present disclosure are "100% solids", meaning that they do not contain volatile solvents and that substantially all of the mass that is deposited on a surface remains on the surface. Another technique that can be used to decrease the viscosity of curable inks is to substantially raise the temperature of the curable ink. However, this is also not desirable for the curable inks of the present disclosure because then the substrates need to be heated to at least the same temperature in order to get the curable inks to spread uniformly on the substrate and achieve the desired surface roughness. It is not practical to heat up a large substrate in a manufacturing environment due to issues with temperature uniformity and reproducibility of the curable ink patterns.

Another issue with the use of inorganic nanoparticles in an optically transparent film is that the nanoparticles tend to agglomerate over time into larger particles that block the transmission of light through the layer and potentially can clog the microscopic nozzles of the inkjet printhead. Surface modifying agents are generally necessary in order to disperse the nanoparticles into a suitable monomeric mixture, and to maintain the nanoparticle dispersions over time.

Therefore, the curable compositions of the present disclosure are useful as curable inks, meaning that they are capable of being printed by for example inkjet printing techniques without the use of solvents and at a temperature of from room temperature to 60° C., or more desirably, of from room temperature to 35° C. Typically, the printable curable composition has a viscosity at these temperatures of 30 centipoise or less. In some embodiments, the curable inks have a viscosity of 20 centipoise or less. It is surprising that the high refractive index curable compositions contain aromatic monomers and surface treated metal oxide nanoparticles and yet remain inkjet printable and provide optically clear coatings.

Without being bound by theory, it is believed that the surface treatment of the metal oxide nanoparticles contributes to their ability to form curable compositions which are inkjet printable. The surface treated metal oxide nanoparticles of this disclosure comprise metal oxide nanoparticles that have been surface treated with a mixture of at least two different silane-functional surface treatment agents. The selection of the two different silane-functional surface treatment agents is tailored to make the surface treated metal oxide particles compatible with aromatic monomer compositions. Therefore, this disclosure also describes surface treated metal oxide nanoparticles that are surface treated with a mixture of at least two different silane-functional surface treatment agents. A wide range of metal oxide nanoparticles are suitable, however, since the desire is to raise the refractive index of the curable composition, higher refractive index metal oxide nanoparticles are more desirable. Examples of suitable metal oxide nanoparticles include metal oxides of titanium, aluminum, hafnium, zinc, tin, cerium, yttrium, indium, antimony, and zirconium, as well as mixed metal oxides such as, for example, indium tin oxide. Particularly suitable because of its high refractive index are titanium oxide nanoparticles, which are commonly referred to as titania nanoparticles.

The curable ink composition, when coated and cured to form a cured layer, the cured layer has a refractive index of at least 1.55 and is optically clear. In some embodiments, the refractive index is at least 1.56, 1.57, 1.58, 1.59, 1.60, 1.61, 1.62, 1.63, 1.64, 1.65, 1.66, 1.67, 1.68, 1.69, or 1.70. As mentioned above, it is desirable that the cured layer be thin. In some embodiments, the cured layer has a thickness of from 1-16 micrometers and a surface roughness of less than 10 nanometers, in some embodiments less than 5 nanometers. Surface roughness in this context refers to the arithmetic mean deviation $R_a$ as defined by the equation:

$$R_a = \frac{1}{n}\sum_{i=1}^{n}|y_i|$$

Where the roughness trace includes n ordered equally spaced data points along the trace, and $y_i$ is vertical distance from the mean line to the $i^{th}$ point. In this way the cured layer is suitable for use as a decoupling layer in the thin film encapsulation of an OLED device as described above.

Also disclosed herein are articles, especially optical articles that comprise multiple layers of films, substrates and coatings. Among the articles of this disclosure are articles comprising a substrate, a cured layer adjacent to the substrate, and an inorganic barrier layer disposed on the cured layer. The cured layer comprises a cured organic matrix comprising at least one aromatic (meth)acrylate and surface treated metal oxide nanoparticles, where the layer that has a thickness of from 1-16 micrometers, and has a refractive index of 1.55 or greater, and is optically clear. In some embodiments, the refractive index is at least 1.56, 1.57, 1.58, 1.59, 1.60, 1.61, 1.62, 1.63, 1.64, 1.65, 1.66, 1.67, 1.68, 1.69, or 1.70.

Additionally, this disclosure describes methods for preparing articles, especially optical articles, where the method includes depositing a curable ink composition as described above on the surface of a substrate to form a curable layer, and curing the curable layer. As described above, inkjet printing is often the method of depositing the curable ink composition on the surface of a substrate, and, as mentioned above, it is surprising that the curable ink composition which contains surface-treated metal oxide nanoparticles is inkjet printable. Additionally, formulated curable ink compositions have a shelf life, in other words a time whereby the formulated curable ink remains essentially unchanged and usable. One way to describe this shelf life is that a curable ink printed pattern with the initially formulated curable ink is substantially similar to a pattern printed at a later time, for example 24 hours later. Many things can affect the shelf life of a curable ink formulation. In the present compositions, because the curable ink compositions comprise nanoparticles, shelf life can be adversely affected by agglomeration of the nanoparticles. Thus, it is desirable that the inkjet printable compositions of this disclosure also have a suitable shelf life. As mentioned above, the surface treatment of the metal oxide nanoparticles not only aids in dispersal within the organic monomers, but also aids in preventing agglomeration of the metal oxide nanoparticles. In some embodiments, the shelf life of the curable ink compositions is at least 24 hours. In other embodiments, the shelf life of the curable ink compositions is at least 1 month. In other embodiments, the shelf life is longer than 1 month and may even be considered to be indefinite.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" refers to two layers that are proximate to another layer. Layers that are adjacent may be in direct contact with each other, or there may be an intervening layer. There is no empty space between layers that are adjacent.

The curable ink compositions are "substantially solvent free" or "solvent free". As used herein, "substantially solvent free" refers to the curable ink compositions having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). The term "solvent free" implies that no solvent is present in the composition. It should be noted that whether the curable ink composition is substantially solvent free or solvent free, no solvent is deliberately added.

Typically, the curable ink compositions are described as "100% solids". As used herein, "100% solids" refers to curable ink compositions that contain essentially no volatile solvents and therefore essentially all of the mass that is deposited on a surface remains there, no volatile mass is lost from the coating.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the Tg values provided by the monomer supplier for homopolymers prepared from those monomers, as is understood by one of skill in the art.

The terms "room temperature" and "ambient temperature" are used interchangeably and have their conventional meaning, that is to say a temperature of from 20-25° C.

The term "agglomeration" is used according to its commonly understood definition as defined by IUPAC, where agglomeration is synonymous with flocculation and according to the IUPAC definition, flocculation is "a process of contact and adhesion whereby the particles of a dispersion form larger-size clusters".

The term "organic" as used herein to refer to a cured layer, means that the layer is prepared from organic materials and is free of inorganic materials. When used in conjunction with compositions that contain the metal oxide nanoparticles of the present disclosure, the term organic refers to the portion of the composition that is not the metal oxide nanoparticles.

The term "(meth)acrylate" refers to monomeric acrylic or methacrylic esters of alcohols. Acrylate and methacrylate monomers or oligomers are referred to collectively herein as "(meth)acrylates". The term "(meth)acrylate-based" as used herein refers to a polymeric composition that comprises at least one (meth)acrylate monomer and may contain additional (meth)acrylate or non-(meth)acrylate co-polymerizable ethylenically unsaturated monomers. Polymers that are (meth)acrylate based comprise a majority (that is to say greater than 50% by weight) of (meth)acrylate monomers.

The terms "free radically polymerizable" and "ethylenically unsaturated" are used interchangeably and refer to a reactive group which contains a carbon-carbon double bond which is able to be polymerized via a free radical polymerization mechanism.

The term "hydrocarbon group" as used herein refers to any monovalent group that contains primarily or exclusively carbon and hydrogen atoms. Alkyl and aryl groups are examples of hydrocarbon groups.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are polyoxyalkylenes where the heteroatom is oxygen such as for example,

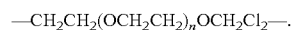

—CH$_2$CH$_2$(OCH$_2$CH$_2$)$_n$OCH$_2$Cl$_2$—.

The term "heteroaromatic" or "heteroaryl" are used interchangeably and as used herein refers to an aromatic ring that contains at least one heteroatom in the ring structure.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

Unless otherwise indicated, "optically transparent" refers to a layer, film, or article that has a high light transmittance over at least a portion of the visible light spectrum (about 400 to about 700 nm). Typically optically transparent layers, films, or articles have a luminous transmission of at least 80%.

Unless otherwise indicated, "optically clear" refers to an layer, film, or article that has a high light transmittance over at least a portion of the visible light spectrum (about 400 to about 700 nm), and that exhibits low haze. Typically optically clear layers, films, or articles have visible light transmittance values of at least 80%, often at least 90%, and haze values of 5% or less, often 2% or less. Luminous transmission and haze can be measured using the techniques described in the Examples section.

Disclosed herein are curable, coatable compositions, articles prepared from these curable, coatable compositions, devices that include the articles prepared from these curable, coatable compositions, and methods of preparing articles and devices. The curable, coatable compositions comprise a curable aromatic monomer composition and surface-treated metal oxide nanoparticles. These surface-treated metal oxide nanoparticles include at least two silane-functional surface treatment agents. As used herein the terms "curable ink composition" and "curable, coatable compositions" are used interchangeably. The curable, coatable compositions are inkjet printable, even if these compositions are deposited on a surface by a different method. Thus, the term "inkjet printable" refers to a composition that is capable of being inkjet printed even if the composition is delivered by other deposition techniques. Being inkjet printable places strict performance requirements upon a coatable composition, including viscosity limitations. Typically, the viscosity of the inkjet printable compositions of this disclosure are 30 centipoise or less. This viscosity limitation is achieved without the addition of solvent (including water) and without heating the curable, coatable composition to a temperature of greater than 60° C. The curable ink composition upon curing has a refractive index of at least 1.55 and is optically transparent or even optically clear.

As mentioned above, it is surprising that the curable ink compositions of this disclosure are inkjet printable despite comprising surface-treated metal oxide nanoparticles. A wide range of metal oxide nanoparticles are suitable, but as mentioned above, metal oxide nanoparticles with a high refractive index are desirable since the goal is to raise the refractive index of the curable ink compositions. Examples of suitable metal oxide nanoparticles include metal oxides of titanium, aluminum, hafnium, zinc, tin, cerium, yttrium, indium, antimony, and zirconium, as well as mixed metal oxides such as, for example, indium tin oxide. In this context, a high refractive index refers to a refractive index of 2.0 or higher. Among the more desirable metal oxide nanoparticles are those of titanium, aluminum, and zirconium. Particularly suitable because of its high refractive index are nanoparticles of titanium oxide commonly referred to as titania nanoparticles. In many instances a single type of metal oxide nanoparticle is used, but mixtures of metal oxide nanoparticle may also be used.

The size of such particles is chosen to avoid significant visible light scattering. The surface-treated metal oxide nanoparticles can be particles having a (e.g. unassociated) primary particle size or associated particle size of greater than 1 nm, 5 nm or 10 nm. The primary or associated particle size is generally less than 100 nm, 75 nm, or 50 nm. Typically the primary or associated particle size is less than 40 nm, 30 nm, or 20 nm. It is desirable that the nanoparticles are unassociated and remain unassociated over time. Their measurements can be based on transmission electron microscopy (TEM) or dynamic light scattering (DLS).

Zirconia and titania nanoparticles can have a particle size from 5 to 50 nm, or 5 to 15 nm, or 8 nm to 12 nm. Suitable zirconias (nanoparticles of zirconium dioxide) are available from Nalco Chemical Co. under the trade designation "Nalco OOSSOO8" and from Buhler AG Uzwil, Switzerland under the trade designation "Buhler zirconia Z-WO sol". Titania nanoparticles (nanoparticles of titanium dioxide) are particularly suitable. Titania nanoparticles containing a mixture of anatase and brookite crystal structures are commercially available from Showa Denko Corp. of Japan as "NTB-1".

The nanoparticles are surface-treated to improve compatibility with the organic matrix material and to keep the nanoparticles non-associated, non-agglomerated, or a combination thereof, in the curable ink composition. The surface treatment used to generate the surface-treated nanoparticles is a silane surface treatment agent comprising at least two silane-functional surface treatment agents.

The surface-treated metal oxide nanoparticles comprise metal oxide nanoparticles with a surface treatment comprising a mixture of at least two silane-functional surface treatment agents wherein the at least two silane-functional surface treatment agents comprise one aromatic-containing silane-functional surface treatment agent with the general Formula I:

$(R^a)_{3-d}(R^bO)_d$—Si-A-Y    Formula I wherein each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group; and at least one silane-functional surface treatment agent comprising a co-polymerizable group with the general Formula II:

$(R^a)_{3-d}(R^bO)_d$—Si—B—Z    Formula II wherein each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

In some embodiments, the silane-functional surface treatment agent of general Formula I comprises:

$(R^a)_{3-d}(R^bO)_d$—Si-A-Y    Formula I wherein each $R^a$ independently comprises an alkyl group with 1-5 carbon atoms; each $R^b$ independently comprises an alkyl group with 1-3 carbon atoms; d is an integer of 1-3; A is a divalent hydrocarbon linking group of —$(CH_2)$—$_a$ where a is an integer of 1-5; a divalent aromatic-containing linking group; or a hydrocarbon linking group substituted with one or more heteroatoms; and Y is an aromatic-containing group of —Ar; —O—Ar; —O—(CO)—Ar; or —(CO)—Ar, wherein each Ar is an aryl group; and (CO) is a carbonyl group C=O.

In other embodiments, the silane-functional surface treatment agent of general Formula I comprises:

$(R^a)_{3-d}(R^bO)_d$—Si-A-Y  Formula I wherein each $R^b$ independently comprises an alkyl group with 1-2 carbon atoms; d is 3; A is a divalent hydrocarbon linking group of —$(CH_2)$—$_a$ where a is an integer of 1-5; and Y is phenyl; substituted phenyl; biphenyl, substituted biphenyl; —O-Ph; —O—(CO)-Ph; or —(CO)-Ph, wherein each Ph is a phenyl or substituted phenyl group; and (CO) is a carbonyl group C=O.

In some embodiments, the at least one silane-functional surface treatment agent comprising a co-polymerizable group with the general Formula II:

$(R^a)_{3-d}(R^bO)_d$—Si—B—Z  Formula II wherein each $R^a$ independently comprises an alkyl group with 1-5 carbon atoms; each $R^b$ independently comprises an alkyl group with 1-3 carbon atoms; d is an integer of 1-3; B is a divalent hydrocarbon linking group of —$(CH_2)$—$_b$ where b is an integer of 3-10; and Z is an ethylenically unsaturated functional group comprising —O—(CO)—C(R2)=$CH_2$, where (CO) is a carbonyl group C=O, and R2 is a hydrogen atom or a methyl group.

A wide range of molar ratios of the two silane-functional surface treatment agents are suitable. Molar ratio in this context means the ratio between the molar amount (number of moles) of the at least one aromatic-containing silane-functional surface treatment agent to the molar amount of the at least one silane-functional surface treatment agent comprising a co-polymerizable group. Generally, the molar ratio of aromatic-containing silane-functional surface treatment agent to silane-functional surface treatment agent comprising a co-polymerizable group is in the range of 30:70 to 5:95.

The surface-treated nanoparticles are prepared by placing a sol (dispersion in water, typically of acidic pH) of the metal oxide nanoparticles in a water-miscible solvent and treating the resulting mixture with the silane-functional surface treatment agents. Typically, the mixture is heated and the solvent is removed under vacuum. Such processes are well understood in the art and are fully described in the Examples section.

A wide range of loadings of the surface-treated metal oxide nanoparticles in the curable ink composition are suitable. Typically, the curable ink composition comprises at least 2% by weight of surface treated metal oxide nanoparticles. Typically, the curable ink composition comprises at most 50% by weight of surface treated metal oxide nanoparticles.

The curable ink compositions also comprise a curable aromatic monomer composition. This monomer composition comprises at least one curable aromatic monomer, and may be a mixture of curable aromatic monomers. The curable aromatic monomer composition cures to form an organic matrix and this organic matrix serves as a binder matrix for the surface-treated metal oxide nanoparticles described above. Additionally, since the surface-treated metal oxide nanoparticles include at least one silane-functional surface treatment agent that comprises a co-polymerizable group, the co-reaction of these co-polymerizable groups with the curable aromatic monomer or monomers helps to keep the metal oxide nanoparticles from phase separating in the organic matrix during the curing process.

A wide range of curable aromatic monomers are suitable for use in the curable ink compositions of this disclosure. Generally, it is desirable to have the curable aromatic monomer composition have a refractive index that is as high as possible, so that the overall curable ink composition has as high of a refractive index as possible. However, typically the viscosity of the curable monomer composition increases as the refractive index increases, so there is a tradeoff between viscosity and refractive index. Particularly suitable curable aromatic monomer compositions are ones that have a refractive index of at least 1.50.

Typically, the curable aromatic monomer composition comprises at least one aromatic (meth)acrylate compound. In some embodiments, the at least one aromatic (meth)acrylate compound comprises a compound of Formula III:

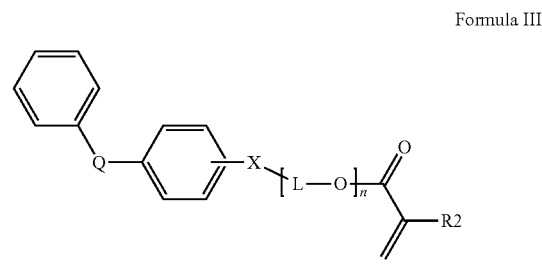

Formula III wherein R2 is H or $CH_3$; X is linked to the aromatic group at either the ortho, para, or meta position and is O, S, or a single bond; Q is a single bond, O, S, $SiR_2$ where R is an alkyl group, a carbonyl group (C=O), an amino group NR where R is hydrogen or an alkyl, or an $SO_2$ group; n is an integer ranging from 0 to 10; and L is an alkylene group having 1 to 5 carbon atoms, optionally substituted with hydroxyl groups.

In some embodiments, the at least one aromatic (meth)acrylate compound comprises a compound of Formula III:

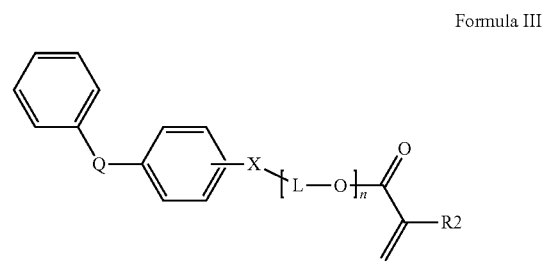

Formula III wherein R2 is a hydrogen; n is 1; L is a methylene group; X is a single bond; and Q is a single bond.

In some embodiments, the at least one aromatic (meth)acrylate compound comprises a compound of Formula III:

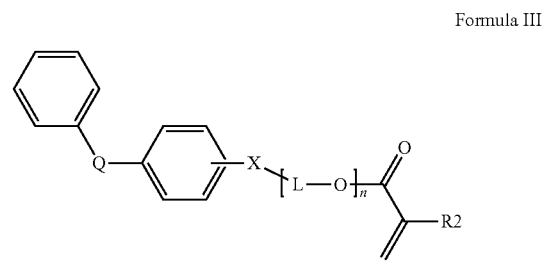

Formula III wherein R2 is a hydrogen; n is 1; L is a methylene group; X is a single bond; and Q is a sulfur.

As mentioned above, in some embodiments of the curable ink composition, the curable aromatic monomer composition comprises a mixture of aromatic (meth)acrylate compounds. In some embodiments, the curable aromatic monomer composition may comprise at least one multifunctional (meth)acrylate monomer. Examples of suitable multifunctional (meth)acrylate monomers include ones containing heteroaromatic groups, fused aromatic groups, heteroalkylene groups, or groups containing both heteroalkylene and aromatic groups. Examples of suitable monofunctional and multifunctional (meth)acrylate monomers include the ones described in the application Ser. No. 62/439,973 filed Dec. 29, 2016.

Examples of suitable multifunctional (meth)acrylates include those of general Formula IV:

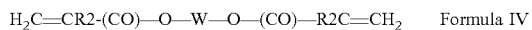

where R2 is hydrogen or methyl, (CO) is a carbonyl group C=O, and W is divalent group comprising a heteroaromatic group, a fused aromatic group, a hetroalkylene group, or a group containing both heteroalkylene and aromatic groups. Examples of heteroaromatic groups include thiadiazole groups, thiazole groups, and thiophene groups. Examples of fused aromatic groups include naphthyl groups, anthracenyl groups, and fluorenyl groups. Examples of heteroalkylene groups include polyethylene oxide groups, polypropylene oxide groups, polythioether groups, and the like. Examples of groups containing both heteroalkylene and aromatic groups include ones with the difunctional alkylene groups with 2-10 carbon atoms, and have from 1-10 repeat units, and contain difunctional aromatic groups such as phenylene, benzylene, or linked benzylene groups.

Examples of particularly suitable multifunctional (meth)acrylate monomers described by Formula IV, include the hetero aromatic compound: 1,3,4-thiadiazole-2,5-diyl(bis(sulfanediyl))bis(ethane-2,1-diyl) diacrylate (TDZDA).

Another suitable multifunctional (meth)acrylate monomer is the fused aromatic compound bisphenol fluorene diacrylate commercially available as part of a curable mixture from Miwon Specialty Chemicals, Exton, Pa. as "HR 6042".

Other suitable multifunctional (meth)acrylate monomers are ones of Formula IV that are bisphenol di(meth)acrylates, i.e. the reaction product of a bisphenol-A diglycidyl ether and acrylic acid. Although bisphenol-A diglycidyl ether is generally more widely available, it is appreciated that other biphenol diglycidyl ether such as bisphenol-F diglycidyl ether could also be employed. One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

Other multifunctional (meth)acrylate monomers can also be used that have functionalities higher than 2, such as trifunctional, tetrafunctional, and the like. Additionally, mixtures of multifunctional (meth)acrylate monomers can also be used.

Since the multifunctional (meth)acrylate monomers have functionalities of 2 or greater, these monomers serve as crosslinking agents and crosslink the forming polymer. The amount of multifunctional (meth)acrylate monomer is controlled to prevent the polymer from becoming inflexible. Typically the curable ink composition comprises less than 20% by weight of the multifunctional (meth)acrylate monomer or monomers. More typically the curable ink composition comprises 10% or even less than 10% by weight of the multifunctional (meth)acrylate monomer or monomers.

The curable ink compositions may also comprise at least one initiator. The curable compositions can be cured by exposure to, for example, an electron beam to initiate polymerization without the need for an added initiator, but typically the curable ink compositions are curable by exposure to actinic radiation or heat and thus include an initiator. Generally the initiator is a photoinitiator, meaning that the initiator is activated by light, typically ultraviolet (UV) light. Photoinitiators are well understood by one of skill in the art of (meth)acrylate polymerization. Examples of suitable free radical photoinitiators include OMNIRAD 4265, OMNIRAD 184, OMNIRAD 651, OMNIRAD 1173, OMNIRAD 819, OMNIRAD TPO, OMNIRAD TPO-L, commercially available from IGM Resins USA, Inc., Charlotte, N.C.

Generally, the photoinitiator is used in amounts of 0.01 to 5 parts by weight, more typically 0.1 to 2.5, parts by weight relative to 100 parts by weight of total reactive components.

The curable ink composition may contain additional reactive or unreactive components, but such components are not necessary, and as long as the added components are not detrimental to the final properties of the formed nanoparticle-filled organic matrix.

Also disclosed herein are articles that may be prepared from the curable ink compositions described above. Among the articles are multilayer articles comprising a substrate, and an inorganic barrier layer, with a cured ink composition layer between them, where the cured ink composition layer functions as a decoupling layer. The substrate may optionally have an inorganic coating layer present on its surface, so that the cured ink composition layer may be in contact with substrate surface or with the optional inorganic coating layer.

An example of this type of article is shown in FIG. 1, where article 100 comprises substrate 110 with cured ink composition layer 120 adjacent to the substrate, and inorganic barrier layer 130 in contact with cured ink composition layer 120. FIG. 1 also includes optional inorganic layer 140 which is in contact with substrate 110 and in contact with cured ink composition layer 120.

Substrate 110 includes a wide array of flexible and non-flexible substrates. For example, substrate 110 may be glass or a relatively thick layer of a polymeric material such as PMMA (polymethyl methacrylate) or PC (polycarbonate). Alternatively, substrate 110 may be flexible polymeric film such as films of PET (polyethylene terephthalate), PEN (polyethylene naphthalate), PC (polycarbonate), cyclic olefin polymer (COP), polyimide, PEEK (polyetherether ketone), and the like.

Cured ink composition layer 120 is a cured layer of the curable ink compositions described above. Again, it is important to note that while the curable composition is described as an "ink", this just means that the composition is printable and not necessarily that the cured ink composition layer 120 has been printed, since as described above, other coating methods can also be used. In many embodiments, however, the cured ink composition layer 120 has been coated by printing, especially inkjet printing, and then has been cured. Cured ink composition layer 120 has all of the properties described above, namely the layer has a thickness of from 1-16 micrometers, the layer has a refractive index of 1.55 or greater, and is optically clear. Additionally, in many embodiments, the cured ink composition layer 120 has a surface roughness of less than or equal to 10 nanometers, in some embodiments less than or equal to 5 nanometers.

The inorganic layer barrier layer 130 in contact with cured ink composition layer 120 can be prepared from a variety of materials including metals, metal oxides, metal nitrides, metal oxynitrides, metal carbides, metal oxyborides, and combinations thereof. A wide range of metals are suitable use in the metal oxides, metal nitrides, and metal oxynitrides, particularly suitable metals include Al, Zr, Si, Zn, Sn, and Ti.

While the refractive index of the inorganic barrier layer 130 is not particularly limited, generally it is greater than 1.60, and in many embodiments the refractive index of the inorganic barrier layer is 1.70 or greater. One particularly suitable inorganic barrier layer material is silicon nitride.

The thickness of the inorganic barrier layer 130 is not particularly limited, generally it is between 20 nanometers and 1 micrometer (1000 nanometers). More typically the thickness is from 20 nanometers to 100 nanometers.

The inorganic barrier layer can be deposited on the cured ink composition layer 120 in a variety of ways. In general, any suitable deposition method can be utilized. Examples of suitable methods include vacuum processes such as sputtering, chemical vapor deposition, atomic layer deposition, metal-organic chemical vapor deposition, plasma enhanced chemical vapor deposition, evaporation, sublimation, electron cyclotron resonance-plasma enhanced chemical vapor deposition, and combinations thereof.

In many embodiments, the substrate 110 has inorganic layer 140 disposed thereon. In these embodiments, the cured ink composition layer 120 is in contact with the inorganic layer 140 instead of being in direct contact with the substrate 110 itself. The inorganic layer 140 is similar to inorganic barrier layer 130, and may in fact be a barrier layer. The composition and properties of inorganic layer 140 are the same as for inorganic barrier layer 130. Inorganic layer 140 and inorganic barrier layer 130 may comprise the same material composition or they may be different.

Figure 2:
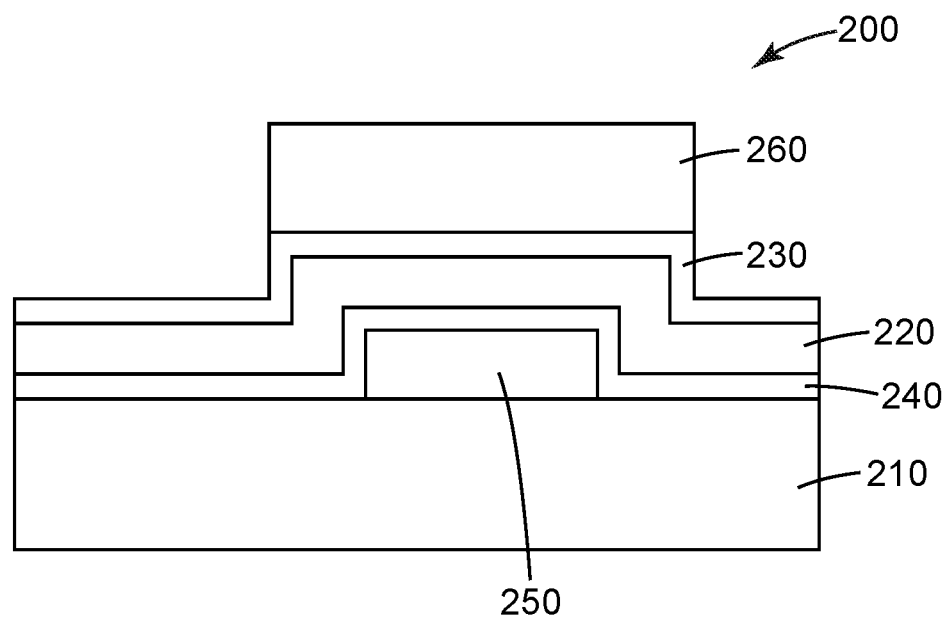
FIG. 2 is a cross sectional view of a device that contains an article of the present disclosure.

FIG. 2 shows a device that includes the multilayer article of the present disclosure. FIG. 2 shows device 200 comprising substrate 210 with device 250 disposed on substrate 210. As with FIG. 1 above, cured ink composition layer 220 is adjacent to the substrate and device 250, and inorganic barrier layer 230 in contact with cured ink composition layer 220. FIG. 2 also includes optional inorganic layer 240 that is in contact with substrate 210 and device 250 and is in contact with cured ink composition layer 220. Optional layer 260 may be a single layer or multiple layers and may include both organic and inorganic layers and may include adhesive layers, optical layers, and the like. Layers 210 (substrate), 220 (cured ink composition layer), 230 (inorganic barrier layer), and 240 (optional inorganic layer) are the same as described above for FIG. 1.

Device 250 may comprise a variety of devices, especially optical devices that for which the use of an inorganic barrier layer is useful. Among the particularly suitable devices are OLED devices. OLED devices have been described above.

Also disclosed herein are methods for preparing articles, especially optical articles. These methods comprise, providing a substrate with a first major surface and a second major surface, providing a curable ink composition, disposing the curable ink composition on the second major surface of the substrate to form a curable layer, and curing the curable layer to form a cured ink composition layer with thickness of from 1-16 micrometers, where the cured ink composition layer has a refractive index of 1.55 or greater and is optically clear. In some embodiments, the refractive index is at least 1.56, 1.57, 1.58, 1.59, 1.60, 1.61, 1.62, 1.63, 1.64, 1.65, 1.66, 1.67, 1.68, 1.69, or 1.70. In many embodiments, the surface roughness of the cured ink composition layer is less than 10 nanometers, in some embodiments less than or equal to 5 nanometers. To the surface of this cured ink composition layer is deposited an inorganic barrier layer.

In many embodiments, the disposing of the curable ink composition on the second major surface of the substrate to form a curable layer comprises printing, especially inkjet printing. As described above, inkjet printing has a variety of desirable features that make it particularly suitable for preparing the curable layer, including the ability to deposit precise patterns on complex substrates and form a uniform coating with a surface roughness that is less than 10 nanometers, in some embodiments less than or equal to 5 nanometers.

The curable ink compositions used in this method are the curable ink compositions described above. In some embodiments, the curable ink compositions include a photoinitiator, and curing of the curable layer comprises photo curing. The nature of the photoinitiator determine the curing conditions, i.e. radiation wavelength used, duration of the exposure to radiation, etc.

As described above, the articles of this disclosure may include additional elements. In some embodiments, the method may further comprise providing a device such as an OLED, and placing the device on the second major surface of the substrate prior to disposing the curable ink composition on the second major surface of the substrate to form a curable layer. Also, the article may further comprise an inorganic layer disposed on the substrate and device surfaces. In these embodiments, the inorganic layer is disposed on the substrate and device surfaces prior to disposing the curable ink composition on the second major surface of the substrate to form a curable layer. Additionally, as described above, additional layers may be added to the exposed surface of the inorganic barrier after the inorganic barrier layer is disposed on the cured ink composition layer.

The disclosure includes the following embodiments:

Among the embodiments are curable ink compositions. Embodiment 1 is a curable ink composition comprising: a curable aromatic monomer composition; and surface treated metal oxide nanoparticles, wherein the surface treated metal oxide nanoparticles comprise metal oxide nanoparticles that have been surface treated with a mixture of at least two silane-functional surface treatment agents; wherein the curable ink composition is inkjet printable, having a viscosity of 30 centipoise or less at a temperature of from room temperature to 60° C., and is free from solvents, and wherein the curable ink composition when printed and cured has a refractive index of 1.55 or greater, and is optically clear.

Embodiment 2 is the curable ink composition of embodiment 1, where the metal oxide nanoparticles comprise metal oxides of titanium, aluminum, hafnium, zinc, tin, cerium, yttrium, indium, antimony, and zirconium, or mixed metal oxides thereof.

Embodiment 3 is the curable ink composition of embodiment 1 or 2, wherein the metal oxide nanoparticles comprise titania nanoparticles.

Embodiment 4 is the curable ink composition of any of embodiments 1-3, wherein the at least two silane-functional surface treatment agents comprise at least one aromatic-containing silane-functional surface treatment agent with the general Formula I:

$$(R^a)_{3-d}(R^bO)_d\text{—Si-A-Y} \qquad \text{I}$$

wherein each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group; and at least one silane-functional surface treatment agent comprising a co-polymerizable group with the general Formula II:

$(R^a)_{3-d}(R^bO)_d$—Si—B—Z    II wherein each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

Embodiment 5 is the curable ink composition of embodiment 4, wherein the silane-functional surface treatment agent of general Formula I comprises:

$(R^a)_{3-d}(R^bO)_d$—Si-A-Y    I wherein each $R^a$ independently comprises an alkyl group with 1-5 carbon atoms; each $R^b$ independently comprises an alkyl group with 1-3 carbon atoms; d is an integer of 1-3; A is a divalent hydrocarbon linking group of —$(CH_2)$—$_a$ where a is an integer of 1-5; a divalent aromatic-containing linking group; or a hydrocarbon linking group substituted with one or more heteroatoms; and Y is an aromatic-containing group of Ar; —O—Ar; —O—(CO)—Ar; or —(CO)—Ar wherein each Ar is an aryl group; and (CO) is a carbonyl group C=O.

Embodiment 6 is the curable ink composition of embodiment 4 or 5, wherein the silane-functional surface treatment agent of general Formula I comprises:

$(R^a)_{3-d}(R^bO)_d$—Si-A-Y    I each $R^b$ independently comprises an alkyl group with 1-2 carbon atoms; d is 3; A is a divalent hydrocarbon linking group of —$(CH_2)$—$_a$ where a is an integer of 1-5; and Y is phenyl; substituted phenyl; biphenyl, substituted biphenyl; —O-Ph; —O—(CO)-Ph; or —(CO)-Ph wherein each Ph is a phenyl or substituted phenyl group; and (CO) is a carbonyl group C=O.

Embodiment 7 is the curable ink composition of any of embodiments 4-6, wherein the at least one silane-functional surface treatment agent comprising a co-polymerizable group with the general Formula II:

$(R^a)_{3-d}(R^bO)_d$—Si—B—Z    II wherein each $R^a$ independently comprises an alkyl group with 1-5 carbon atoms; each $R^b$ independently comprises an alkyl group with 1-3 carbon atoms; d is an integer of 1-3; B is a divalent hydrocarbon linking group of —$(CH_2)$—$_b$ where b is an integer of 3-10; and Z is an ethylenically unsaturated functional group comprising —O—(CO)—C(R2)=$CH_2$, where (CO) is a carbonyl group C=O, and R2 is a hydrogen atom or a methyl group.

Embodiment 8 is the curable ink composition of any of embodiments 4-7, wherein the molar ratio of aromatic-containing silane-functional surface treatment agent to silane-functional surface treatment agent comprising a co-polymerizable group is in the range of 30:70 to 5:95.

Embodiment 9 is the curable ink composition of any of embodiments 1-8, wherein the curable aromatic monomer composition has a refractive index of at least 1.50.

Embodiment 10 is the curable ink composition of any of embodiments 1-9, wherein the curable aromatic monomer composition comprises at least one aromatic (meth)acrylate compound.

Embodiment 11 is the curable ink composition of embodiment 10, wherein the at least one aromatic (meth)acrylate compound comprises a compound of Formula III:

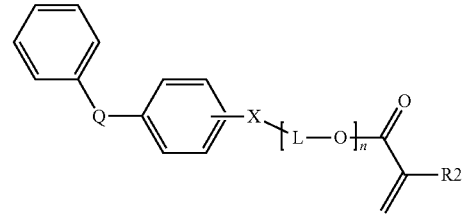

Formula III wherein R2 is H or $CH_3$; X is O, S, or a single bond; Q is a single bond, O, S, $SiR_2$ where R is an alkyl group, a carbonyl group (C=O), an amino group NR where R is hydrogen or an alkyl, or an $SO_2$ group; n is an integer ranging from 0 to 10; and L is an alkylene group having 1 to 5 carbon atoms, optionally substituted with hydroxyl groups.

Embodiment 12 is the curable ink composition of embodiment 10, wherein the at least one aromatic (meth)acrylate compound comprises a compound of Formula III:

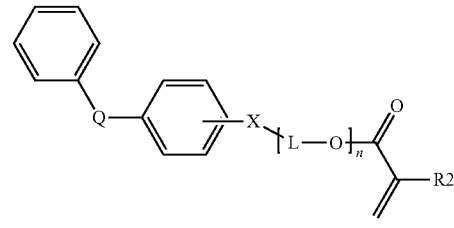

Formula III wherein R2 is H or $CH_3$; X is O, S, or a single bond; Q is a single bond, O, S, $SiR_2$ where R is an alkyl group, a carbonyl group (C=O), an amino group NR where R is hydrogen or an alkyl, or an $SO_2$ group; n is an integer ranging from 0 to 10; and L is an alkylene group having 1 to 5 carbon atoms, optionally substituted with hydroxyl groups.

Embodiment 13 is the curable ink composition of embodiment 11 or 12, wherein R2 is a hydrogen; n is 1; L is a methylene group; X is a single bond; and Q is a single bond or a sulfur.

Embodiment 14 is the curable ink composition of embodiment 11 or 12, wherein R2 is a hydrogen; n is 1; L is a methylene group; X is a single bond; and Q is a sulfur.

Embodiment 15 is the curable ink composition of embodiment 11 or 12, wherein R2 is a hydrogen; n is 1; L is a methylene group; X is a single bond; and Q is a single bond.

Embodiment 16 is the curable ink composition of any of embodiments 1-15, wherein the curable ink composition comprises at least 2% by weight of surface treated metal oxide nanoparticles.

Embodiment 17 is the curable ink composition of any of embodiments 1-16, wherein the curable ink composition comprises no more than 50% by weight of surface treated metal oxide nanoparticles.

Embodiment 18 is the curable ink composition of any of embodiments 1-17, wherein the curable aromatic monomer composition comprises a mixture of aromatic (meth)acrylate compounds.

Embodiment 19 is the curable ink composition of any of embodiments 1-18, wherein the curable aromatic monomer composition further comprises at least one multifunctional (meth)acrylate, wherein the multifunctional (meth)acrylate contains heteroaromatic groups, fused aromatic groups, heteroalkylene groups, or a group containing both heteroalkylene and aromatic groups.

Embodiment 20 is the curable ink composition of embodiment 19, wherein the multifunctional (meth)acrylate is of general Formula IV:

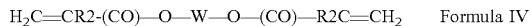

$$H_2C=CR2-(CO)-O-W-O-(CO)-R2C=CH_2 \quad \text{Formula IV}$$

wherein R2 is hydrogen or methyl; (CO) is a carbonyl group C=O; and W is a divalent group comprising a heteroaromatic group, a fused aromatic group, a heteroalkylene group, or a group containing both heteroalkylene and aromatic groups.

Embodiment 21 is the curable ink composition of embodiment 20, wherein W comprises a heteroaromatic group comprising a thiadiazole group, a thiazole group, or a thiophene group.

Embodiment 22 is the curable ink composition of embodiment 20, wherein W comprises a fused aromatic group comprising a naphthyl group, an anthracenyl group, or a fluorenyl group.

Embodiment 23 is the curable ink composition of embodiment 20, wherein W comprises a heteroalkylene group comprising a polyethylene oxide group, a polypropylene oxide group, or a polythioether group.

Embodiment 24 is the curable ink composition of embodiment 20, wherein W comprises a group containing both heteroalkylene and aromatic groups wherein the heteroalkylene group comprises a difunctional alkylene group with 2-10 carbon atoms, and having 1-10 repeat units, and the aromatic group comprises a difunctional aromatic group comprising a phenylene group, a benzylene group, or a linked benzylene group.

Embodiment 25 is the curable ink composition of embodiment 20, wherein the multifunctional (meth)acrylate monomers described by Formula IV, comprises the hetero aromatic compound: 1,3,4-thiadiazole-2,5-diyl(bis(sulfanediyl))bis(ethane-2,1-diyl) diacrylate (TDZDA).

Embodiment 26 is the curable ink composition of embodiment 20, wherein the multifunctional (meth)acrylate monomers described by Formula IV, comprises the fused aromatic compound bisphenol fluorene diacrylate.

Embodiment 27 is the curable ink composition of embodiment 20, wherein the multifunctional (meth)acrylate monomer described by Formula IV, comprises the bisphenol-A ethoxylated diacrylate monomer.

Embodiment 28 is the curable ink composition of embodiment 19, wherein the multifunctional (meth)acrylate monomer comprises a trifunctional, or tetrafunctional (meth) acrylate monomer.

Embodiment 29 is the curable ink composition of any of embodiments 19-28, wherein the curable ink composition comprises less than 20% by weight of the multifunctional (meth)acrylate monomer or monomers.

Embodiment 30 is the curable ink composition of any of embodiments 19-28, wherein the curable ink composition comprises less than 10% by weight of the multifunctional (meth)acrylate monomer or monomers.

Embodiment 31 is the curable ink composition of any of embodiments 1-30, wherein the curable ink composition further comprises at least one initiator Embodiment 32 is the curable ink composition of embodiment 31, wherein the initiator comprises a photoinitiator and the curable ink composition is curable by exposure to actinic radiation.

Embodiment 33 is the curable ink composition of any of embodiments 1-32, wherein the curable ink composition has a shelf life of at least 24 hours.

Embodiment 34 is the curable ink composition of any of embodiments 1-33, wherein the curable ink composition has a shelf life of at least 1 month.

Embodiment 35 is the curable ink composition of any of embodiments 1-34, wherein the curable ink composition has a shelf life of greater than 1 month.

Also disclosed are articles. Embodiment 36 is an article comprising: a substrate with a first major surface and a second major surface; a cured layer adjacent to at least a portion of the second major surface of the substrate, wherein the cured layer comprises a cured organic matrix comprising at least one aromatic (meth)acrylate and surface-treated metal oxide nanoparticles, wherein the surface treated metal oxide nanoparticles comprise metal oxide nanoparticles that have been surface treated with a mixture of at least two silane-functional surface treatment agents, wherein the cured layer has a refractive index of 1.55 or greater, and is optically clear; and an inorganic barrier layer in contact with the cured layer.

Embodiment 37 is the article of embodiment 36, wherein the cured layer comprises a curable ink composition that has been printed and cured on at least a portion of the second major surface of the substrate, wherein the curable ink composition comprises: an aromatic curable liquid composition; and surface treated metal oxide nanoparticles, wherein the surface treated metal oxide nanoparticles comprise metal oxide nanoparticles that have been surface treated with a mixture of at least two silane-functional surface treatment agents; wherein the curable ink composition is inkjet printable, having a viscosity of 30 centipoise or less at a temperature of from room temperature to 60° C., and is free from solvents, and wherein the curable ink composition when printed and cured has a refractive index of 1.55 or greater, and is optically clear.

Embodiment 38 is the article of embodiment 37, where the metal oxide nanoparticles comprise metal oxides of titanium, aluminum, hafnium, zinc, tin, cerium, yttrium, indium, antimony, and zirconium, or mixed metal oxides thereof.

Embodiment 39 is the article of embodiment 37 or 38, wherein the metal oxide nanoparticles comprise titania nanoparticles.

Embodiment 40 is the article of any of embodiments 37-39, wherein the at least two silane-functional surface treatment agents comprise at least one aromatic-containing silane-functional surface treatment agent with the general Formula I:

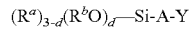

$$(R^a)_{3-d}(R^bO)_d\text{—Si-A-Y} \quad \text{I}$$

wherein each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group; and at least one silane-functional surface treatment agent comprising a co-polymerizable group with the general Formula II:

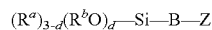

$$(R^a)_{3-d}(R^bO)_d\text{—Si—B—Z} \quad \text{II}$$

wherein each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

Embodiment 41 is the article of embodiment 40, wherein the silane-functional surface treatment agent of general Formula I comprises:

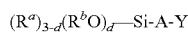

wherein each $R^a$ independently comprises an alkyl group with 1-5 carbon atoms; each $R^b$ independently comprises an alkyl group with 1-3 carbon atoms; d is an integer of 1-3; A is a divalent hydrocarbon linking group of —$(CH_2)$—$_a$ where a is an integer of 1-5; a divalent aromatic-containing linking group; or a hydrocarbon linking group substituted with one or more heteroatoms; and Y is an aromatic-containing group of Ar; —O—Ar; —O—(CO)—Ar; or —(CO)—Ar wherein each Ar is an aryl group; and (CO) is a carbonyl group C=O.

Embodiment 42 is the article of embodiment 40 or 41, wherein the silane-functional surface treatment agent of general Formula I comprises:

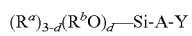

each $R^b$ independently comprises an alkyl group with 1-2 carbon atoms; d is 3; A is a divalent hydrocarbon linking group of —$(CH_2)$—$_a$ where a is an integer of 1-5; and Y is phenyl; substituted phenyl; biphenyl, substituted biphenyl; —O-Ph; —O—(CO)-Ph; or —(CO)-Ph wherein each Ph is a phenyl or substituted phenyl group; and (CO) is a carbonyl group C=O.

Embodiment 43 is the article of any of embodiments 40-42, wherein the at least one silane-functional surface treatment agent comprising a co-polymerizable group with the general Formula II:

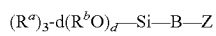

wherein each $R^a$ independently comprises an alkyl group with 1-5 carbon atoms; each $R^b$ independently comprises an alkyl group with 1-3 carbon atoms; d is an integer of 1-3; B is a divalent hydrocarbon linking group of —$(CH_2)$—$_b$ where b is an integer of 3-10; and Z is an ethylenically unsaturated functional group comprising —O—(CO)—C(R2)=$CH_2$, where (CO) is a carbonyl group C=O, and R2 is a hydrogen atom or a methyl group.

Embodiment 44 is the article of any of embodiments 40-43, wherein the molar ratio of aromatic-containing silane-functional surface treatment agent to silane-functional surface treatment agent comprising a co-polymerizable group is in the range of 30:70 to 595.

Embodiment 45 is the article of any of embodiments 37-44, wherein the curable aromatic monomer composition has a refractive index of at least 1.50.

Embodiment 46 is the article of any of embodiments 37-45, wherein the curable aromatic monomer composition comprises at least one aromatic (meth)acrylate compound.

Embodiment 47 is the article of embodiment 46, wherein the at least one aromatic (meth)acrylate compound comprises a compound of Formula III:

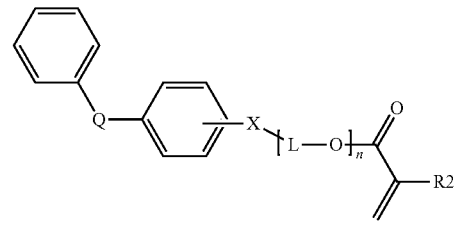

Formula III wherein R2 is H or $CH_3$; X is O, S, or a single bond; Q is a single bond, O, S, $SiR_2$ where R is an alkyl group, a carbonyl group (C=O), an amino group NR where R is hydrogen or an alkyl, or an $SO_2$ group; n is an integer ranging from 0 to 10; and L is an alkylene group having 1 to 5 carbon atoms, optionally substituted with hydroxyl groups.

Embodiment 48 is the article of embodiment 46, wherein the at least one aromatic (meth)acrylate compound comprises a compound of Formula III:

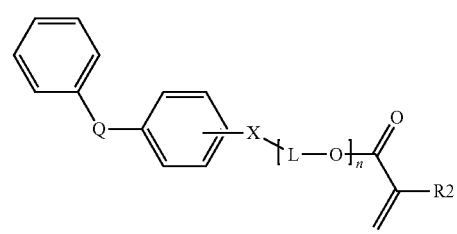

Formula III wherein R2 is H or $CH_3$; X is O, S, or a single bond; Q is a single bond, O, S, $SiR_2$ where R is an alkyl group, a carbonyl group (C=O), an amino group NR where R is hydrogen or an alkyl, or an $SO_2$ group; n is an integer ranging from 0 to 10; and L is an alkylene group having 1 to 5 carbon atoms, optionally substituted with hydroxyl groups.

Embodiment 49 is the article of embodiment 47 or 48, wherein R2 is a hydrogen; n is 1; L is a methylene group; X is a single bond; and Q is a single bond or a sulfur.

Embodiment 50 is the article of embodiment 47 or 48, wherein R2 is a hydrogen; n is 1; L is a methylene group; X is a single bond; and Q is a sulfur.

Embodiment 51 is the article of embodiment 47 or 48, wherein R2 is a hydrogen; n is 1; L is a methylene group; X is a single bond; and Q is a single bond.

Embodiment 52 is the article of any of embodiments 37-51, wherein the curable ink composition comprises at least 2% by weight of surface treated metal oxide nanoparticles.

Embodiment 53 is the article of any of embodiments 37-52, wherein the curable ink composition comprises no more than 50% by weight of surface treated metal oxide nanoparticles.

Embodiment 54 is the article of any of embodiments 37-53, wherein the curable aromatic monomer composition comprises a mixture of aromatic (meth)acrylate compounds.

Embodiment 55 is the article of any of embodiments 37-54, wherein the curable aromatic monomer composition further comprises at least one multifunctional (meth)acrylate, wherein the multifunctional (meth)acrylate contains heteroaromatic groups, fused aromatic groups, heteroalkylene groups, or a group containing both heteroalkylene and aromatic groups.

Embodiment 56 is the article of embodiment 55, wherein the multifunctional (meth)acrylate is of general Formula IV:

$$H_2C=CR2\text{-}(CO)\text{—}O\text{—}W\text{—}O\text{—}(CO)\text{—}R2C=CH_2 \quad \text{Formula IV}$$

wherein R2 is hydrogen or methyl; (CO) is a carbonyl group C=O; and W is a divalent group comprising a heteroaromatic group, a fused aromatic group, a heteroalkylene group, or a group containing both heteroalkylene and aromatic groups.

Embodiment 57 is the article of embodiment 56, wherein W comprises a heteroaromatic group comprising a thiadiazole group, a thiazole group, or a thiophene group.

Embodiment 58 is the article of embodiment 56, wherein W comprises a fused aromatic group comprising a naphthyl group, an anthracenyl group, or a fluorenyl group.

Embodiment 59 is the article of embodiment 56, wherein W comprises a heteroalkylene group comprising a polyethylene oxide group, a polypropylene oxide group, or a polythioether group.

Embodiment 60 is the article of embodiment 56, wherein W comprises a group containing both heteroalkylene and aromatic groups wherein the heteroalkylene group comprises a difunctional alkylene group with 2-10 carbon atoms, and having 1-10 repeat units, and the aromatic group comprises a difunctional aromatic group comprising a phenylene group, a benzylene group, or a linked benzylene group.

Embodiment 61 is the article of embodiment 56, wherein the multifunctional (meth)acrylate monomers described by Formula IV, comprises the hetero aromatic compound: 1,3,4-thiadiazole-2,5-diyl)bis(sulfanediyl))bis(ethane-2,1-diyl) diacrylate (TDZDA).

Embodiment 62 is the article of embodiment 56, wherein the multifunctional (meth)acrylate monomers described by Formula IV, comprises the fused aromatic compound bisphenol fluorene diacrylate.

Embodiment 63 is the article of embodiment 56, wherein the multifunctional (meth)acrylate monomer described by Formula IV, comprises the bisphenol-A ethoxylated diacrylate monomer.

Embodiment 64 is the article of embodiment 55, wherein the multifunctional (meth)acrylate monomer comprises a trifunctional, or tetrafunctional (meth)acrylate monomer.

Embodiment 65 is the article of any of embodiments 55-64, wherein the curable ink composition comprises less than 20% by weight of the multifunctional (meth)acrylate monomer or monomers.

Embodiment 66 is the article of any of embodiments 55-64, wherein the curable ink composition comprises less than 10% by weight of the multifunctional (meth)acrylate monomer or monomers.

Embodiment 67 is the article of any of embodiments 37-67, wherein the curable ink composition further comprises at least one initiator Embodiment 68 is the article of embodiment 67, wherein the initiator comprises a photoinitiator and the curable ink composition is curable by exposure to actinic radiation.

Embodiment 69 is the article of any of embodiments 37-68, wherein the curable ink composition has a shelf life of at least 24 hours.

Embodiment 70 is the article of any of embodiments 37-69, wherein the curable ink composition has a shelf life of at least 1 month.

Embodiment 71 is the article of any of embodiments 37-70, wherein the curable ink composition has a shelf life of greater than 1 month.

Embodiment 72 is the article of any of embodiments 37-71, wherein the cured layer has a thickness of from 1-16 micrometers, and a surface roughness of less than or equal to 5 nanometers.

Embodiment 73 is the article of any of embodiments 36-72, wherein the article further comprises a device disposed on the second major surface of the substrate, and adjacent to the cured layer.

Embodiment 74 is the article of embodiment 73, wherein the device comprises an OLED (organic light-emitting diode).

Also disclosed are methods of preparing articles. Embodiment 75 is the method of preparing an article comprising: providing a substrate with a first major surface and a second major surface; providing a curable ink composition wherein the curable ink composition comprises: a curable aromatic monomer composition; and surface treated metal oxide nanoparticles, wherein the surface treated metal oxide nanoparticles comprise metal oxide nanoparticles that have been surface treated with a mixture of at least two silane-functional surface treatment agents; wherein the curable ink composition is inkjet printable, having a viscosity of 30 centipoise or less at a temperature of from room temperature to 60° C., and is free from solvents, and wherein the curable ink composition when printed and cured has a refractive index of 1.55 or greater, and is optically clear; disposing the curable ink composition on at least a portion of the second major surface of the substrate to form a curable layer; curing the curable layer to form a cured layer; and depositing an inorganic barrier layer on the cured layer.

Embodiment 76 is the method of embodiment 75, where the metal oxide nanoparticles comprise metal oxides of titanium, aluminum, hafnium, zinc, tin, cerium, yttrium, indium, antimony, and zirconium, or mixed metal oxides thereof.

Embodiment 77 is the method of embodiment 75 or 76, wherein the metal oxide nanoparticles comprise titania nanoparticles.

Embodiment 78 is the method of any of embodiments 75-77, wherein the at least two silane-functional surface treatment agents comprise at least one aromatic-containing silane-functional surface treatment agent with the general Formula I:

$$(R^a)_{3-d}(R^bO)_d\text{—Si-A-Y} \quad \text{I}$$

wherein each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group; and at least one silane-functional surface treatment agent comprising a co-polymerizable group with the general Formula II:

$$(R^a)_{3-d}(R^bO)_d\text{—Si—B—Z} \quad \text{II}$$

wherein each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

Embodiment 79 is the method of embodiment 78, wherein the silane-functional surface treatment agent of general Formula I comprises:

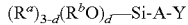

$(R^a)_{3-d}(R^bO)_d$—Si-A-Y  I wherein each $R^a$ independently comprises an alkyl group with 1-5 carbon atoms; each $R^b$ independently comprises an alkyl group with 1-3 carbon atoms; d is an integer of 1-3; A is a divalent hydrocarbon linking group of —(CH$_2$)—$_a$ where a is an integer of 1-5; a divalent aromatic-containing linking group; or a hydrocarbon linking group substituted with one or more heteroatoms; and Y is an aromatic-containing group of Ar; —O—Ar; —O—(CO)—Ar; or —(CO)—Ar wherein each Ar is an aryl group; and (CO) is a carbonyl group C=O.

Embodiment 80 is the method of embodiment 78 or 79, wherein the silane-functional surface treatment agent of general Formula I comprises:

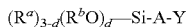

$(R^a)_{3-d}(R^bO)_d$—Si-A-Y  I each $R^b$ independently comprises an alkyl group with 1-2 carbon atoms; d is 3; A is a divalent hydrocarbon linking group of —(CH$_2$)—$_a$ where a is an integer of 1-5; and Y is phenyl; substituted phenyl; biphenyl, substituted biphenyl; —O-Ph; —O—(CO)-Ph; or —(CO)-Ph wherein each Ph is a phenyl or substituted phenyl group; and (CO) is a carbonyl group C=O.

Embodiment 81 is the method of any of embodiments 75-80, wherein the at least one silane-functional surface treatment agent comprising a co-polymerizable group with the general Formula II:

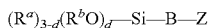

$(R^a)_{3-d}(R^bO)_d$—Si—B—Z  II wherein each $R^a$ independently comprises an alkyl group with 1-5 carbon atoms; each $R^b$ independently comprises an alkyl group with 1-3 carbon atoms; d is an integer of 1-3; B is a divalent hydrocarbon linking group of —(CH$_2$)—$_b$ where b is an integer of 3-10; and Z is an ethylenically unsaturated functional group comprising —O—(CO)—C(R2)=CH$_2$, where (CO) is a carbonyl group C=O, and R2 is a hydrogen atom or a methyl group.

Embodiment 82 is the method of any of embodiments 75-81, wherein the molar ratio of aromatic-containing silane-functional surface treatment agent to silane-functional surface treatment agent comprising a co-polymerizable group is in the range of 30:70 to 5:95.

Embodiment 83 is the method of any of embodiments 75-82, wherein the curable aromatic monomer composition has a refractive index of at least 1.50.

Embodiment 84 is the method of any of embodiments 75-83, wherein the curable aromatic monomer composition comprises at least one aromatic (meth)acrylate compound.

Embodiment 85 is the method of embodiment 84, wherein the at least one aromatic (meth)acrylate compound comprises a compound of Formula III:

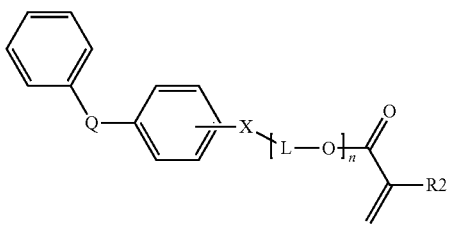

Formula III wherein R2 is H or CH$_3$; X is O, S, or a single bond; Q is a single bond, O, S, SiR$_2$ where R is an alkyl group, a carbonyl group (C=O), an amino group NR where R is hydrogen or an alkyl, or an SO$_2$ group; n is an integer ranging from 0 to 10; and L is an alkylene group having 1 to 5 carbon atoms, optionally substituted with hydroxyl groups.

Embodiment 86 is the method of embodiment 84, wherein the at least one aromatic (meth)acrylate compound comprises a compound of Formula III:

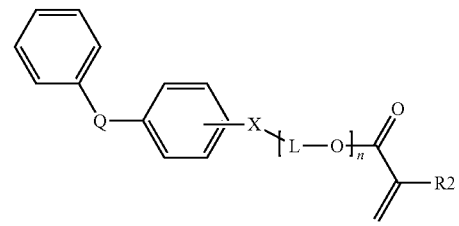

Formula III wherein R2 is H or CH$_3$; X is O, S, or a single bond; Q is a single bond, O, S, SiR$_2$ where R is an alkyl group, a carbonyl group (C=O), an amino group NR where R is hydrogen or an alkyl, or an SO$_2$ group; n is an integer ranging from 0 to 10; and L is an alkylene group having 1 to 5 carbon atoms, optionally substituted with hydroxyl groups.

Embodiment 87 is the method of embodiment 85 or 86, wherein R2 is a hydrogen; n is 1; L is a methylene group; X is a single bond; and Q is a single bond or a sulfur.

Embodiment 88 is the method of embodiment 85 or 86, wherein R2 is a hydrogen; n is 1; L is a methylene group; X is a single bond; and Q is a sulfur.

Embodiment 89 is the method of embodiment 85 or 86, wherein R2 is a hydrogen; n is 1; L is a methylene group; X is a single bond; and Q is a single bond.

Embodiment 90 is the method of any of embodiments 75-89, wherein the curable ink composition comprises at least 2% by weight of surface treated metal oxide nanoparticles.

Embodiment 91 is the method of any of embodiments 75-90, wherein the curable ink composition comprises no more than 50% by weight of surface treated metal oxide nanoparticles.

Embodiment 92 is the method of any of embodiments 75-91, wherein the curable aromatic monomer composition comprises a mixture of aromatic (meth)acrylate compounds.

Embodiment 93 is the method of any of embodiments 75-92, wherein the curable aromatic monomer composition further comprises at least one multifunctional (meth)acrylate, wherein the multifunctional (meth)acrylate contains heteroaromatic groups, fused aromatic groups, heteroalkylene groups, or a group containing both heteroalkylene and aromatic groups.

Embodiment 94 is the method of embodiment 93, wherein the multifunctional (meth)acrylate is of general Formula IV:

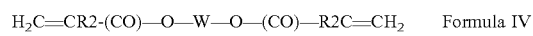

H$_2$C=CR2-(CO)—O—W—O—(CO)—R2C=CH$_2$  Formula IV wherein R2 is hydrogen or methyl; (CO) is a carbonyl group C=O; and W is a divalent group comprising a heteroaromatic group, a fused aromatic group, a heteroalkylene group, or a group containing both heteroalkylene and aromatic groups.

Embodiment 95 is the method of embodiment 94, wherein W comprises a heteroaromatic group comprising a thiadiazole group, a thiazole group, or a thiophene group.

Embodiment 96 is the method of embodiment 94, wherein W comprises a fused aromatic group comprising a naphthyl group, an anthracenyl group, or a fluorenyl group.

Embodiment 97 is the method of embodiment 94, wherein W comprises a heteroalkylene group comprising a polyethylene oxide group, a polypropylene oxide group, or a polythioether group.

Embodiment 98 is the method of embodiment 94, wherein W comprises a group containing both heteroalkylene and aromatic groups wherein the heteroalkylene group comprises a difunctional alkylene group with 2-10 carbon atoms, and having 1-10 repeat units, and the aromatic group comprises a difunctional aromatic group comprising a phenylene group, a benzylene group, or a linked benzylene group.

Embodiment 99 is the method of embodiment 94, wherein the multifunctional (meth)acrylate monomers described by Formula IV, comprises the hetero aromatic compound: 1,3,4-thiadiazole-2,5-diyl(bis(sulfanediyl))bis(ethane-2,1-diyl) diacrylate (TDZDA).

Embodiment 100 is the method of embodiment 94, wherein the multifunctional (meth)acrylate monomers described by Formula IV, comprises the fused aromatic compound bisphenol fluorene diacrylate.

Embodiment 101 is the method of embodiment 94, wherein the multifunctional (meth)acrylate monomer described by Formula IV, comprises the bisphenol-A ethoxylated diacrylate monomer.

Embodiment 102 is the method of embodiment 93, wherein the multifunctional (meth)acrylate monomer comprises a trifunctional, or tetrafunctional (meth)acrylate monomer.

Embodiment 103 is the article of any of embodiments 93-102, wherein the curable ink composition comprises less than 20% by weight of the multifunctional (meth)acrylate monomer or monomers.

Embodiment 104 is the article of any of embodiments 93-102, wherein the curable ink composition comprises less than 10% by weight of the multifunctional (meth)acrylate monomer or monomers.

Embodiment 105 is the method of any of embodiments 75-104, wherein the curable ink composition further comprises at least one initiator Embodiment 106 is the method of embodiment 105, wherein the initiator comprises a photoinitiator and the curable ink composition is curable by exposure to actinic radiation.

Embodiment 107 is the method of any of embodiments 75-106, wherein the curable ink composition has a shelf life of at least 24 hours.

Embodiment 108 is the method of any of embodiments 75-107, wherein the curable ink composition has a shelf life of at least 1 month.

Embodiment 109 is the method of any of embodiments 75-108, wherein the curable ink composition has a shelf life of greater than 1 month.

Embodiment 110 is the method of any of embodiments 75-109, wherein disposing of the curable ink composition on the second major surface of the substrate to form a curable layer comprises inkjet printing to a thickness of from 1-16 micrometers.

Embodiment 111 is the method of any of embodiments 75-110, wherein the cured layer has a surface roughness that is less than 5 nanometers.

Embodiment 112 is the method of any of embodiments 75-111, further comprising providing a device; and disposing the device on the second major surface of the substrate prior to disposing the curable ink composition on the second major surface of the substrate to form a curable layer.

Embodiment 113 is the method of embodiment 112, wherein the device comprises an OLED device.

Also disclosed are surface treated metal oxide nanoparticles. Embodiment 114 is surface treated metal oxide nanoparticles comprising: metal oxide nanoparticles with a surface treatment comprising a mixture of at least two silane-functional surface treatment agents wherein the at least two silane-functional surface treatment agents comprise one aromatic-containing silane-functional surface treatment agent with the general Formula I:

$$(R^a)_{3-d}(R^bO)_d\text{—Si-A-Y} \qquad \text{I}$$

wherein each $R^a$ independently comprises an alkyl group with 1-5 carbon atoms; each $R^b$ independently comprises an alkyl group with 1-3 carbon atoms; d is an integer of 1-3; A is a divalent linking group containing 1-5 carbon atoms; and Y is an aromatic-containing group;
and at least one silane-functional surface treatment agent comprising a co-polymerizable group with the general Formula II:

$$(R^a)_{3-d}(R^bO)_d\text{—Si—B—Z} \qquad \text{II}$$

wherein each $R^a$ independently comprises an alkyl group with 1-5 carbon atoms; each $R^b$ independently comprises an alkyl group with 1-3 carbon atoms; d is an integer of 1-3; B is a divalent linking group containing at least 3 carbon atoms; and Z is an ethylenically unsaturated functional group.

Embodiment 115 is the surface treated metal oxide nanoparticles of embodiment 114, wherein the metal oxide nanoparticles comprise metal oxides of titanium, aluminum, hafnium, zinc, tin, cerium, yttrium, indium, antimony, and zirconium, or mixed metal oxides thereof.

Embodiment 116 is the surface treated metal oxide nanoparticles of embodiment 114 or 115, wherein the metal oxide nanoparticles comprise titania nanoparticles.

Embodiment 117 is the surface treated metal oxide nanoparticles of any of embodiments 114 or 116, wherein the silane-functional surface treatment agent of general Formula I comprises:

$$(R^a)_{3-d}(R^bO)_d\text{—Si-A-Y} \qquad \text{I}$$

each $R^b$ independently comprises an alkyl group with 1-2 carbon atoms; d is 3; A is a divalent hydrocarbon linking group of —(CH$_2$)—$_a$ where a is an integer of 1-5; and Y is phenyl; substituted phenyl; biphenyl, substituted biphenyl; —O-Ph; —O—(CO)-Ph; or —(CO)-Ph wherein each Ph is a phenyl or substituted phenyl group; and (CO) is a carbonyl group C=O.

Embodiment 118 is the surface treated metal oxide nanoparticles of any of embodiments 114-117, wherein the at least one silane-functional surface treatment agent comprising a co-polymerizable group with the general Formula II:

$$(R^a)_{3-d}(R^bO)_d\text{—Si—B—Z} \qquad \text{II}$$

wherein each $R^a$ independently comprises an alkyl group with 1-5 carbon atoms; each $R^b$ independently comprises an alkyl group with 1-3 carbon atoms; d is an integer of 1-3; B is a divalent hydrocarbon linking group of —(CH$_2$)—$_b$ where b is an integer of 3-10; and Z is an ethylenically unsaturated functional group comprising —O—(CO)—C(R2)=CH$_2$, where (CO) is a carbonyl group C=O, and R2 is a hydrogen atom or a methyl group.

Embodiment 119 is the surface treated metal oxide nanoparticles of any of embodiments 114-118, wherein the molar ratio of aromatic-containing silane-functional surface treatment agent to silane-functional surface treatment agent comprising a co-polymerizable group is in the range of 30:70 to 5:95.

EXAMPLES

High refractive-index nanocomposite inkjet ink compositions were prepared. The materials were applied to substrates and the rheological and optical properties were evaluated as shown in the following examples. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

TABLE 1

Table of Materials

| Patent Abbreviation | Material Abbreviation | Description |
|---|---|---|
| M1 | M1192H | Biphenylmethyl acrylate, available from Miwon Inc. Exton, PA., as MIRAMER M1192H |
| M1A | M1192HP | Distilled version of M1192H |
| M2 | SR508IJ | Dipropylene glycol diacrylate (Sartomer, Exton, PA) (SR508U) |
| M3 | SR489D | Tridecyl acrylate (Sartomer, Exton, PA) |
| M4 | PTPBA | Para-(phenylthio) benzyl acrylate (PTPBA) was synthesized as shown in Synthesis Example 1 below. |
| M5 | TDZDA | 1,3,4-thiadiazole-2,5-diyl)bis(sulfanediyl)bis(ethane-2,1-diyl) diacrylate (TDZDA) was synthesized as shown in Synthesis Example 2 below. |
| M6 | HEMA | Hydroxyethyl methacrylate (Aldrich) |
| M7 | HBMA | Hydroxybutyl methacrylate (Aldrich) |
| P1 | $TiO_2$ | Titanium dioxide (NTB-01, anatase/brookite, 15.6 wt %, pH ~2.3) Showa Denko, Tokyo, Japan |
| P1A | $TiO_2$ (sonicated) | NTB-01 Sonicated with Branson Probe Sonifier, 50% power, 3 min |
| P2 | $ZrO_2$ | Zirconia nanoparticle sol prepared as described in U.S. Pat. No. 7,241,437 (Davidson et al.) Example 6 (49% solids in $H_2O$) |
| P3 | $SiO_2$ | 20 nm NALCO 2327 silica, 40.6 wt % solids in $H_2O$, pH 9, Nalco( Naperville, IL) |
| S1 | BzOPTMS | Benzoyloxypropyltrimethoxysilane (Gelest, Morrisville, PA) |
| S2 | PEG2 | [2-(2-Methoxyethoxy)ethoxy] amidopropyl trimethoxysilane (as described in Preparation of Coating Solution "C" in U.S. Pat. No. 9,403,300 B2.) |
| S3 | A1230 | Poly(alkyleneoxide) trimethoxysilane (A1230, Momentive Performance Materials (Waterford, NY)) |
| S4 | KBM-5803 | Methacryloxyoctyltrimethoxysilane "KBM-5803 Shin Etsu (Tokyo, Japan) |
| S5 | PTMS | Phenyltrimethoxysilane (Gelest, Morrisville, PA) |
| S6 | A174 | Methacryloxypropyltrimethoxysilane Momentive Performance Materials (Waterford, NY) |
| S7 | MTMS | Methyltrimethoxysilane (Gelest, Morrisville, PA) |
| S8 | BPhTES | 4-biphenylyltriethoxysilane (Gelest, Morrisville, PA) |

TABLE 1-continued

Table of Materials

| Patent Abbreviation | Material Abbreviation | Description |
|---|---|---|
| S9 | K90 | As described in US publication No. 2015203708 (Klun et al.) Preparative Example 7 |
| S10 | HEMA-Urethane | Synthesis described below |
| S11 | HBMA-Urethane | Synthesis described below |
| S12 | PPTMS | Phenylpropyltrimethoxysilane (abcr GmbH, Germany) |
| S13 | PhOPTMS | Phenoxypropyltrimethoxysilane (Gelest, Morrisville, PA) |
| S14 | IOTMS | Isooctyltrimethoxysilane (Gelest, Morrisville, PA) |
| S15 | KBM-1083 | 4-vinyloctyltrimethoxysilane (Shin Etsu, Tokyo, Japan) |
| S16 | KBM-4803 | 4-glycidoxyoctyltrimethoxysilane (Shin Etsu, Tokyo, Japan) |
| S17 | BzTES | Benzyltriethoxysilane (Gelest, Morrisville, PA) |
| S18 | ICPTES | Isocyanatopropyltriethoxysilane (Gelest, Morrisville, PA |
| PI | TPO-L | Ethyl(2, 4, 6-trimethylbenzoyl)phenyl phosphinate (IGM Resins USA, Inc., Charlotte, NC) |
| IER | A26 | AMBERLYST A26 (OH) from Dow Chemical Company Midland, MI |
| I1 | Prostab 5198 | 4-hydroxy-TEMPO (BASF, Wyandotte, MI) |
| I2 | DBTDL | Dibutyltin dilaurate (Aldrich) |

SYNTHESIS EXAMPLES

Synthesis 1: Synthesis of para-thiophenyl benzyl acrylate (PTPBA)

To a 2 L two necked round bottomed flask was added 100 g (0.463 mol) of para-(phenylthio)benzyl alcohol (S1) followed by addition of 350 mL of dichloromethane (DCM). The solution was stirred, and to it was added 77 mL (56 g, 0.5556 mol) of trimethylamine (TEA). The flask was then placed in an ice bath, and the solution was stirred under $N_2$— atmosphere. 56.3 mL (62.7 g, 0.6944 mol) of acryloyl chloride in 100 mL dichloromethane (DMC) was added dropwise to the stirring solution (under ice bath) using an addition funnel, which was connected to a drying tube that contained DRIERITE (W A Hammond Drierite Co., LTD, Xenia, Ohio). After the addition was complete, the solution was warmed to RT, and stirred overnight under $N_2$ atmosphere at room temperature.

Completion of the reaction was assessed by thin-layer chromatography of the crude reaction using 5:1 S2:S3 as the mobile phase. The flask was placed in an ice bath, and the reaction was quenched using saturated sodium bicarbonate. Most of the DCM was evaporated using rotary evaporation. The crude solution was then taken in S3, and the organic part was extracted using water (2 times) and brine (once). The organic layer was dried over $MgSO_4$, filtered, and the solvent was evaporated to yield the crude product as a brown oil. Wiped film evaporation distillation (conditions 140 deg C. jacket, 22 mTorr vacuum, 10 C condenser low flow) followed by column chromatography (5:1 S2:S3 as the mobile phase) of the crude product gave 76 g of the pure product as a colorless oil. 7 mg of BHT (inhibitor) was added into the final acrylate.

Synthesis 2: Synthesis of 1,3,4-thiadiazole-2,5-diyl)
bis(sulfanediyl)bis(ethane-2,1-diyl) diacrylate
(TDZDA)

Step 1: Synthesis of 2,2'-((1,3,4-thiadiazole-2,5-diyl)bis(sulfanediyl))bis(ethan-1-ol) (TDZ-OH)

Sodium hydroxide (21.0 g, 525 mmol) was placed in a round bottom flask with a stir bar and dissolved in water (80 mL). 1,3,4-Thiadiazole-2,5-dithiol (38.6 g, 257 mmol) was added slowly and the mixture stirred for 1 hr until the solution became homogeneous. After such time, 2-chloro-ethanol (40 mL, 600 mmol) was added dropwise. The mixture was heated to 60° C. for 2 hr and then allowed to cool to rt. The product precipitated from solution and was filtered and dried in a vacuum oven (60° C., 1 torr) overnight. A white, crystalline solid was obtained (53.2 g, 87% yield).

Step 2: Synthesis of 1,3,4-thiadiazole-2,5-diyl)bis(sulfanediyl)bis(ethane-2,1-diyl) diacrylate (TDZDA)

Into a flame dried 2-neck flask equipped with a stir bar and addition funnel, was placed TDZ-OH (50.0 g, 210 mmol). Dichloromethane (DMC) (400 mL) was added along with 4-dimethylaminopyridine (2.56 g, 20.7 mmol) and trimethylamine (TEA) (80 mL, 574 mmol). The system was flushed with $N_2$ and a mixture of acryloyl chloride (65 mL, 799 mmol) and dichloromethane (DMC) (100 mL) was added to the addition funnel. The reaction flask was cooled to 0° C. with an ice bath and the acryloyl chloride/$CH_2Cl_2$ mixture was added slowly, dropwise over several hours. The reaction mixture was stirred overnight, warming to rt. After such time, the mixture was cooled to 0° C. and then quenched with methanol (20 mL), followed by a saturated aqueous solution of sodium bicarbonate. The organic layer was separated from the aqueous layer and washed with water, followed by brine, dried ($MgSO_4$), filtered and concentrated. The viscous oil obtained was purified by automated flash chromatography (Biotage Isolera) with S2/S3 and a pale yellow liquid was isolated (41.1 g, 57% yield).

Examples

Preparation of Surface Modifiers "S10" and "S11"

S10 and S11 were made by reacting S18 with equimolar amounts of either M7 or M8, respectively, with a drop (~3 mg) of I2 as catalyst.

Synthesis of Surface-Modified Titania Nanoparticles 125.0 g of an aqueous dispersion of titanium dioxide sol (P1) was combined with anion exchange resin (IER) until the pH reached ~4.0. The resulting sol was placed in a 250 ml three-necked flask. With moderate stirring, 150.0 g of 1-methoxy-2-propanol was added. In some examples about 3 mg of I1 was added. The silanes were added (see table 2 for the ratios of various examples) slowly via syringe until the concentration of silanes was equal to 0.98 mmol/gram $TiO_2$. The mixture was heated to 80° C. and stirred for 16 hours. The mixture was allowed to cool, transferred to a separate flask and the solvent was removed using a rotary evaporator. During the solvent removal, additional 1-methoxy-2-propanol and/or methyl isobutyl ketone were added as needed until the mixture became a partially translucent, white to beige solution. The nanoparticle solvent dispersions were then combined with acrylic monomer M1 or MIA. Typically, the modified nanotitania particle content was 10.0 wt % in acrylic monomer. The remaining solvent was removed by rotary evaporation followed by sparging with dried air.

Synthesis of Surface-Modified Zirconia Nanoparticles 50.0 g of an aqueous dispersion of zirconium dioxide sol (P2) was placed in a 250 ml three-necked flask along with 39.4 g of deionized water to result in a solution at approximately 25% solids. With moderate stirring, 89.4 g of 1-methoxy-2-propanol was added. In some examples about 2 mg of I1 was added. The silanes were added (see table 2 for the ratios of the various examples) slowly via syringe until the concentration of silanes was equal to 1.2 mmol/gram $ZrO_2$. The mixture was heated to 80° C. and stirred for 16 hours. The mixture was allowed to cool, transferred to a separate flask and the solvent was removed using a rotary evaporator. During the solvent removal, additional 1-methoxy-2-propanol and/or methyl isobutyl ketone were added as needed until the mixture became a translucent solution. The nanoparticle solvent dispersions were then combined with acrylic monomer M1A. The remaining solvent was removed by rotary evaporation followed by sparging with dried air. Typically, the modified nanozirconia particle content was 10.0 wt % in acrylic monomer.

Synthesis of Surface-Modified Silica Nanoparticles 113.0 g of an aqueous dispersion of silica sol P3 was placed in a 250 ml three-necked flask. With moderate stirring, 101.0 g of 1-methoxy-2-propanol was added. 3 mg of I1 was added. A mixture of silanes was added dropwise (S1 6.5 g, 0.023 mol, 4 equiv.; S4 1.8 g, 5.7 mmol, 1 equiv.). The mixture was heated to 80° C. and stirred for 24 hours. The mixture was allowed to cool, transferred to a separate flask and the solvent was removed using a rotary evaporator. During the solvent removal, additional 1-methoxy-2-propanol and/or methyl isobutyl ketone were added as needed until the mixture became a translucent white solution (22.6 wt %, 1:3 v/v 1-methoxy-2-propanol-methyl ethyl ketone). The nanoparticle solvent dispersions were then combined with acrylic monomer MIA. Typically, the modified silica particle content was 10.0 wt % in acrylic monomer. The remaining solvent was removed by rotary evaporation followed by sparging with dried air.

TABLE 2

Nanoparticle Surface Modification Table

| Example # | Particle Type | Surface Mod. 1 | Component 1 (mol. %) | Surface Mod. 2 | Component 2 (mol. %) | Component 3 Abbrev. | Component 3 (mol. %) |
|---|---|---|---|---|---|---|---|
| NP-1 | P1 | S6 | 50 | S5 | 50 | — | |
| NP-2 | P1 | S6 | 50 | S5 | 20 | S3 | 30 |
| NP-3 | P1 | S6 | 60 | S5 | 15 | S2 | 25 |
| NP-4 | P1 | S6 | 75 | S2 | 25 | | |
| NP-5 | P1 | S6 | 80 | S7 | 5 | S2 | 15 |
| NP-6 | P1 | S6 | 80 | S3 | 20 | — | |
| NP-7 | P1 | S6 | 80 | S2 | 15 | S7 | 5 |
| NP-8 | P1 | S1 | 80 | S6 | 20 | | |
| NP-9 | P1 | S1 | 70 | S6 | 15 | S2 | 15 |

TABLE 2-continued

Nanoparticle Surface Modification Table

| Example # | Particle Type | Surface Mod. 1 | Component 1 (mol. %) | Surface Mod. 2 | Component 2 (mol. %) | Component 3 Abbrev. | Component 3 (mol. %) |
|---|---|---|---|---|---|---|---|
| NP-10 | P1 | S1 | 80 | S4 | 20 | — | |
| NP-11 | P1 | S1 | 70 | S4 | 15 | S2 | 15 |
| NP-12 | P1 | S1 | 50 | S8 | 30 | S4 | 20 |
| NP-13 | P1 | S3 | 80 | S4 | 20 | | |
| NP-14 | P1 | S9 | 80 | S4 | 20 | | |
| NP-15 | P1 | S1 | 90 | S4 | 10 | | |
| NP-16 | P1 | S1 | 70 | S4 | 30 | | |
| NP-17 | P1 | S1 | 80 | S11 | 20 | | |
| NP-18 | P1 | S1 | 80 | S10 | 20 | | |
| NP-19 | P1 | S1 | 100 | | | | |
| NP-20 | P1 | S1 | 50 | S15 | 50 | | |
| NP-21 | P1 | S12 | 80 | S4 | 20 | | |
| NP-22 | P1 | S1 | 50 | S16 | 50 | | |
| NP-23 | P1 | S4 | 100 | | | | |
| NP-24 | P1 | S14 | 80 | S4 | 20 | | |
| NP-25 | P1 | S13 | 80 | S4 | 20 | | |
| NP-26 | P2 | S1 | 80 | S6 | 20 | | |
| NP-27 | P2 | S1 | 80 | S4 | 20 | | |
| NP-28 | P1A | S1 | 80 | S4 | 20 | | |
| NP-29 | P3 | S1 | 80 | S4 | 20 | | |
| NP-30 | P1 | S5 | 80 | S4 | 20 | | |
| NP-31 | P1 | S17 | 80 | S4 | 20 | | |

Formulation

The surface-modified nanoparticle dispersions were diluted as necessary with spreading modifier and crosslinker according to Table 3. 0.5 wt. % PI was added to all formulations according to the total weight of the mixture. The formulations were mixed and placed in a bath sonicator for 15 minutes or until the solutions appeared homogenous.

TABLE 3

Table of Formulations

| Example # | NP-Type | NP (wt. %) | M1 (%) | M1A (%) | M2 | M3 | M4 | M5 | PI |
|---|---|---|---|---|---|---|---|---|---|
| CE1 | N/A | 0 | | 90 | 5 | 5 | | | 0.5 |
| CE2 | N/A | 0 | | | | 5 | 90 | 5 | 0.5 |
| E1 | NP1 | 6.7 | 83.9 | | 9.3 | | | | 0.5 |
| E2 | NP2 | 6.7 | 83.9 | | 9.3 | | | | 0.5 |
| E3 | NP3 | 6.7 | 83.9 | | 9.3 | | | | 0.5 |
| E4 | NP4 | 6.7 | 83.9 | | 9.3 | | | | 0.5 |
| E5 | NP5 | 6.7 | 83.9 | | 9.3 | | | | 0.5 |
| E6 | NP-6 | 6.7 | 83.9 | | 9.3 | | | | 0.5 |
| E7 | NP-7 | 6.7 | 83.4 | | 10 | | | | 0.5 |
| E8 | NP-8 | 9.5 | 85.9 | | 2.3 | 2.3 | | | 0.5 |
| E9 | NP-9 | 6.7 | 83.4 | | 10 | | | | 0.5 |
| E10 | NP-10 | 18 | | 73.8 | 4.1 | 4.1 | | | 0.5 |
| E11 | NP-10 | 9.5 | | 85.89 | 2.3 | 2.3 | | | 0.5 |
| E12 | NP-10 | 9.5 | 85.89 | | 2.3 | 2.3 | | | 0.5 |
| E13 | NP-10 | 27.5 | | 65.25 | 3.63 | 3.63 | | | 0.5 |
| E14 | NP-11 | 9.5 | | 85.89 | 2.3 | 2.3 | | | 0.5 |
| E15 | NP-12 | 9.5 | | 85.9 | 4.57 | | | | 0.5 |
| E16 | NP-13 | 9.5 | | 85.9 | 2.3 | 2.3 | | | 0.5 |
| E17 | NP-14 | 9.5 | | 85.9 | 2.3 | 2.3 | | | 0.5 |
| E18 | NP-15 | 9.5 | | 85.9 | 2.3 | 2.3 | | | 0.5 |
| E19 | NP-16 | 9.5 | | 85.9 | 2.3 | 2.3 | | | 0.5 |
| E20 | NP-17 | 9.5 | | 85.9 | 2.3 | 2.3 | | | 0.5 |
| E21 | NP-18 | 9.5 | | 85.9 | 2.3 | 2.3 | | | 0.5 |
| E22 | NP-19 | 9.5 | | 85.9 | 2.3 | 2.3 | | | 0.5 |
| E23 | NP-20 | 9.5 | | 85.9 | 2.3 | 2.3 | | | 0.5 |
| E24 | NP-21 | 9.5 | | 85.9 | 2.3 | 2.3 | | | 0.5 |
| E25 | NP-22 | 9.5 | | 85.9 | 2.3 | 2.3 | | | 0.5 |
| E26 | NP-23 | 9.5 | | 85.9 | 2.3 | 2.3 | | | 0.5 |
| E27 | NP-24 | 9.5 | | 85.9 | 2.3 | 2.3 | | | 0.5 |
| E28 | NP-25 | 9.5 | | 85.9 | 2.3 | 2.3 | | | 0.5 |
| E29 | NP-26 | 9.1 | | 81.8 | 4.5 | 4.5 | | | |
| E30 | NP-27 | 9.1 | | 81.8 | 4.5 | 4.5 | | | 0.5 |
| E31 | NP-27 | 27.8 | | 65.0 | 3.6 | 3.6 | | | 0.5 |
| E32 | NP-28 | 9.5 | | 85.9 | 2.3 | 2.3 | | | 0.5 |
| E33 | NP-28 | 9.5 | | 85.9 | | 2.3 | | 2.3 | 0.5 |
| E34 | NP-10 | 9.5 | | | 2.3 | 2.3 | 85.9 | | |
| E35 | NP-10 | | | | 2.3 | 85.9 | 2.3 | | |
| E36 | NP-29 | 9.5 | | 85.9 | 2.3 | 2.3 | | | |
| E37 | NP-30 | 9.5 | | 85.9 | 2.3 | 2.3 | | | 0.5 |
| E38 | NP-31 | 9.5 | | 85.9 | 2.3 | 2.3 | | | 0.5 |

Handspread Coating

Coatings for the optical tests were made on 3 mil (76 micrometer) thick primed PET (Film Type=990197, 3M Co., St. Paul, Minn.) using a wire-wound rod (Model: RDS10, RDS Specialties, Webster, N.Y.). Ultraviolet (UV) curing of the films was performed immediately after coating using a "Light Hammer" system (Heraeus Noblelight Fusion UV Inc., Gaithersburg, Md.) using a "D-bulb" with two passes of the conveyor belt running at 30 feet per minute (9 meters/minute), the light hammer emits 58 mJ/cm$^2$ at 100% power ad 30 feet/minute running rate, thus the sample received about 11.6 mWatts/cm$^2$ total irradiance.

Testing

A variety of tests were carried out as summarized below.

Test Method 1: Transmission, Haze, Clarity, and b* Measurements

The measurement of average % transmission, haze and clarity was conducted with a BYK HAZEGARD Plus, (Byk Gardiner, Columbia, Md.), which is equipment that measures values based on the ASTM D1003-11 standard. B* was measured using an X-RITE SP62 portable spectrophotometer (X-Rite, Grand Rapids, Mich.). The values are recorded in Table 5.

Test Method 2: Refractive Index Measurements

After coating and UV-curing, cured ink films on PET substrates were measured using a digital prism coupler (Model 2010, Metricon Inc., Pennington, N.J.) at 404 nm, 532 nm and 632.8 nm following the method outlined in ASTM C1648-12. The values are recorded in Table 5.

Test Method 3: Ink Viscosity Measurements 17 mL of each ink formulation (without photoinitiator) was loaded into a 25 mm diameter double gap coaxial concentric cylinder apparatus (DIN 53019) on a viscometer (BOHLIN VISCO 88, Malvern Instruments Ltd, Malvern, UK). A thermal jacket equipped to the double gap cell allowed for the flow of recirculating water heated to 25° C., and the system was allowed to equilibrate for 30 min at each temperature prior to taking each measurement. The shear rate was ramped from 100 to 1000 hz, at 100 hz intervals, and the measurement was repeated three times. An average and standard deviation across all data points was taken to represent the viscosity of the formulation in units of centipoise. The values are recorded in Table 4.

Test Method 4: Inkjet Printing and Latency Test

Substrates used were silicon wafers from Pure Wafer (San Jose, Calif.) covered with a layer of native oxide. The wafers were used as is.

The formulations were loaded into the inkjet cartridge (10 pL, DIMATIX DMC-11610, available from Fujifilm). The cartridge was loaded into the inkjet printer (FUJIFILM DIMATIX DMP-2850, available from Fujifilm Dimatix Inc., Santa Clara, USA).

The inkjet printer was used to make an array 5 mm by 5 mm squares on the silicon dioxide wafer. The following parameters were used:

Printhead Temperature=35° C.
Platen Temperature=35° C.
Drop spacing=30 microns (847 dpi)
Print velocity=300 mm/sec
Slew rate=0.65
Frequency=10 kHz
Meniscus set point=4.0
Voltage=approx. 25 v After printing, the formulations were immediately cured under nitrogen until tack-free using a 395 nm UV-LED from Clearstone Inc. (Hopkins, Minn.).

To test the shelf-life stability of the ink, the same ink-loaded cartridge was used to print the same pattern 1-3 days later on silicon wafers. Measurements were taken using a profilometer (KLA Tencor model D500 stylus porfilometer) of the dimensions of the squares and average thickness of the coating after each printing time interval. The profilometer data was also used to measure film non-uniformity according to Equation 1 below. $L_{max}$, $L_{min}$ and $L_{avg}$ are the maximum, minimum and average film thicknesses found on each scan of the profilometer data.

$$\% NU = \frac{L_{max} - L_{min}}{2 * L_{avg}} * 100\% \quad \text{Equation 1}$$

Test Method 5: Surface Roughness Measurement

Atomic Force Microscopy was used to measure the surface roughness of the inkjet printed square patterns. The measurement was performed on a Veeco Dimension Icon microscope operated in tapping mode under ambient conditions in air. Bruker RTESPA silicon cantilever tips with an aluminum backside coating were used during operation (nominal spring constant=40 N/m, nominal frequency=300 kHz, nominal tip radius=8 nm). Image sizes were 1000 nm×250 nm and surface roughness analysis of the height topography was conducted on 6 images per sample, at each time interval. The average from all 6 images was recorded and tabulated in Table 6.

Results

TABLE 4

Measurement of Uncured Ink

| | Viscosity (cps) | | | |
|---|---|---|---|---|
| | 25° C. | | 35° C. | |
| Example # | Average | Standard Deviation | Standard Average | Deviation |
| CE1 | 22.5 | 0.2 | 14.50 | 0.427 |
| CE2 | 15.66 | 1.21 | 12.40 | — |
| E1 | 28.39 | 2.20 | 18.75 | 0.58 |
| E2 | 28.25 | 0.82 | 18.41 | 0.53 |
| E3 | 31.22 | 1.99 | 20.06 | 0.52 |
| E4 | 29.38 | 1.47 | 20.64 | 1.35 |
| E5 | 15.14 | 1.08 | 21.45 | 1.89 |
| E6 | 46.36 | 5.50 | 30.11 | 2.37 |
| E7 | 45.78 | 4.98 | 28.88 | 2.00 |
| E8 | 28.55 | 0.65 | 19.45 | 1.00 |
| E9 | 24.72 | 0.58 | 16.63 | 0.90 |
| E10 | 49.62 | 7.03 | 33.06 | 4.21 |
| E11 | 24.51 | 0.76 | 14.96 | 0.96 |
| E12 | 17.93 | 1.30 | 7.527 | 1.40 |
| E13 | 57.60 | 6.46 | 32.14 | 1.04 |
| E14 | 26.31 | 0.79 | 17.76 | 1.04 |
| E15 | 17.86 | 0.73 | 9.97 | 2.67 |
| E16 | 130.2 | 111.4 | 28.5 | 5.00 |
| E17 | 49.60 | 7.00 | 33.1 | 4.20 |
| E18 | 27.20 | 1.70 | 18.5 | 0.90 |
| E19 | 13.90 | 1.20 | 11.4 | 1.50 |
| E20 | 31.50 | 21.9 | 3.40 | 1.10 |
| E21 | 27.4 | 21.8 | 2.60 | 3.00 |
| E22 | 28.6 | 19.0 | 3.00 | 1.20 |
| E23 | 22.9 | 15.5 | 2.00 | 0.70 |
| E24 | 18.9 | 0.90 | 13.0 | 1.30 |
| E25 | — | 28.9 | 0.45 | — |
| E26 | 218.1 | 132.97 | 13.9 | 0.70 |
| E27 | 229.2 | 134.98 | — | — |
| E28 | 13.11 | 0.43 | 7.66 | 1.35 |
| E29 | 21.30 | 0.25 | 11.09 | 0.51 |
| E30 | 11.13 | 0.72 | 15.98 | 0.90 |
| E31 | — | — | 29.04 | 0.87 |
| E32 | 19.98 | 1.20 | 14.21 | 1.16 |
| E33 | — | — | — | — |
| E34 | 12.06 | 0.40 | 6.99 | 1.46 |
| E35 | — | — | — | — |
| E36 | 17.50 | 1.07 | 9.38 | 1.88 |
| E37 | 17.80 | 0.56 | 12.61 | 0.43 |
| E38 | 18.28 | 0.50 | 12.87 | 0.39 |

TABLE 5

Measurement of Cured Ink Film Optical Properties

| | | Optical Properties | | | | | | |
|---|---|---|---|---|---|---|---|---|
| | Thickness | Transmission | | | | Refractive Index | | |
| Example # | (um) | (%) | Haze (%) | Clarity (%) | b* | 404 nm | 532 nm | 632 nm |
| CE1 | 16.0 | 90.50 | 0.30 | 100.00 | 0.91 | 1.66 | 1.623 | 1.608 |
| CE2 | 14.3 | 89.90 | 0.44 | 99.93 | 1.41 | 1.68 | 1.6382 | 1.627 |

TABLE 5-continued

Measurement of Cured Ink Film Optical Properties

| | | Optical Properties | | | | | | |
|---|---|---|---|---|---|---|---|---|
| | Thickness | Transmission | | | | Refractive Index | | |
| Example # | (um) | (%) | Haze (%) | Clarity (%) | b* | 404 nm | 532 nm | 632 nm |
| E1 | 16.0 | 87.30 | 93.40 | 80.80 | 1.34 | N/A | N/A | N/A |
| E2 | 16.0 | 86.90 | 95.80 | 13.00 | 1.08 | N/A | N/A | N/A |
| E3 | 19.0 | 85.70 | 96.60 | 36.00 | 1.05 | N/A | N/A | N/A |
| E4 | 19.0 | 88.70 | 97.00 | 27.20 | 0.87 | N/A | N/A | N/A |
| E5 | 15.0 | 85.80 | 27.00 | 100.00 | 1.16 | N/A | N/A | N/A |
| E6 | 21.0 | 86.90 | 22.90 | 99.80 | 1.20 | 1.66 | N/A | 1.617 |
| E7 | 13.0 | 84.50 | 29.40 | 99.70 | 1.43 | 1.676 | 1.642 | 1.627 |
| E8 | 17.3 | 89.83 | 21.63 | 98.73 | 0.98 | 1.66 | 1.62 | 1.611 |
| E9 | 16.0 | 86.70 | 7.07 | 100.00 | 1.42 | 1.65 | 1.640 | 1.626 |
| E10 | 17.0 | 88.30 | 1.54 | 100.00 | 2.04 | 1.67 | 1.662 | 1.646 |
| E11 | 18.0 | 88.60 | 2.01 | 100.00 | 1.74 | 1.69 | 1.649 | 1.635 |
| E12 | 12.0 | 88.50 | 2.35 | 100.00 | 1.97 | 1.69 | 1.644 | 1.631 |
| E13 | 11.0 | 85.90 | 11.70 | 100.00 | 1.51 | 1.74 | 1.691 | 1.674 |
| E14 | 20.0 | 93.40 | 90.90 | 97.20 | 1.13 | N/A | N/A | N/A |
| E15 | 15.0 | 88.20 | 6.62 | 99.40 | 1.52 | 1.698 | 1.652 | 1.637 |
| E16 | 14.0 | 89.20 | 5.40 | 100.00 | 1.45 | 1.68 | 1.638 | 1.631 |
| E17 | 15.0 | 82.20 | 40.10 | 99.70 | 1.23 | 1.67 | 1.643 | 1.631 |
| E18 | 14.1 | 86.57 | 3.35 | 100.00 | 1.08 | 1.68 | 1.641 | 1.630 |
| E19 | 14.1 | 89.93 | 15.90 | 98.83 | 0.77 | 1.67 | 1.638 | 1.630 |
| E20 | 25.6 | 85.95 | 8.21 | 99.77 | 1.21 | 1.68 | 1.641 | 1.630 |
| E21 | 19.3 | 84.87 | 11.23 | 99.93 | 1.24 | 1.68 | 1.641 | 1.630 |
| E22 | 18.0 | 84.63 | 11.31 | 99.77 | 1.32 | 1.687 | 1.643 | 1.630 |
| E23 | 16.3 | 86.13 | 13.13 | 98.63 | 1.27 | 1.68 | 1.642 | 1.630 |
| E24 | 16.0 | 92.20 | 5.86 | 100.00 | 1.41 | 1.68 | 1.640 | 1.627 |
| E25 | 31.0 | 87.00 | 44.00 | 42.40 | 1.52 | N/A | N/A | N/A |
| E26 | 15.0 | 84.50 | 78.70 | 96.70 | 1.25 | N/A | N/A | N/A |
| E27 | 17.0 | 87.60 | 90.20 | 89.00 | 1.42 | N/A | N/A | N/A |
| E28 | 16.0 | 89.30 | 5.47 | 99.50 | 0.88 | 1.68 | 1.64 | 1.63 |
| E29 | 15.3 | 90.37 | 0.21 | 99.90 | 1.07 | 1.67 | 1.63 | 1.62 |
| E30 | 17.0 | 90.40 | 0.15 | 99.80 | 0.99 | 1.67 | 1.63 | 1.62 |
| E31 | 17.6 | 90.33 | 0.19 | 98.20 | 1.04 | 1.68 | 1.64 | 1.63 |
| E32 | 14.3 | 89.33 | 0.99 | 100.00 | 1.51 | 1.68 | 1.64 | 1.63 |
| E33 | 15.3 | 89.03 | 0.37 | 100.00 | 1.87 | 1.69 | 1.65 | 1.63 |
| E34 | 15.0 | 88.37 | 0.78 | 100.00 | 3.15 | 1.69 | 1.65 | 1.64 |
| E35 | 15.3 | 88.73 | 1.11 | 100.00 | 3.42 | 1.70 | 1.66 | 1.64 |
| E36 | 16.3 | 90.70 | 1.94 | 100.00 | 0.93 | 1.60 | 1.61 | 1.649 |
| E37 | 16.0 | 86.8 | 5.73 | 99.7 | 1.32 | — | 1.64 | 1.63 |
| E38 | 16 | 88.3 | 0.09 | 100 | 1.30 | 1.68 | 1.64 | 1.63 |

TABLE 6

Inkjet Printing Results

| Example # | Time Elapsed | Height [um] | % NU | Rq [nm] | Ra [nm] | Rmax [nm] |
|---|---|---|---|---|---|---|
| CE1 | 0 | 11.18 | 6.96 | 0.399 | 0.264 | 6.672 |
| | 91 | 18.39 | 7.92 | 0.45 | 0.36 | 3.66 |
| CE2 | 0 | 11.34 | 12.81 | 0.298 | 0.237 | 2.538 |
| | 24 | 14.72 | 8.87 | 0.335 | 0.260 | 4.040 |
| E32 | 0 | 10.56 | 6.14 | 0.671 | 0.462 | 9.308 |
| | 91 | 11.5 | 13.6 | 0.725 | 0.580 | 5.628 |
| E34 | 0 | 11.09 | 12.90 | 0.493 | 0.392 | 3.878 |
| | 24 | 10.20 | 8.94 | 0.628 | 0.486 | 5.243 |

What is claimed is:
1. A curable ink composition comprising:
a curable aromatic monomer composition, wherein the curable monomer composition comprises:
at least one aromatic (meth)acrylate compound of Formula III:

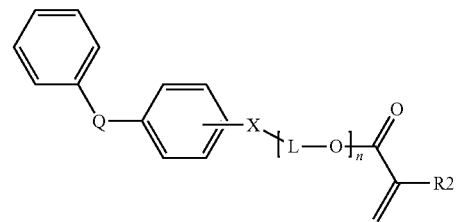

Formula III wherein R2 is H or CH$_3$;
X is linked to the aromatic group at either the ortho, para, or meta position and is O, S, or a single bond;
Q is a single bond, O, S, SiR$_2$ where R is an alkyl group, a carbonyl group (C=O), an amino group NR where R is hydrogen or an alkyl, or an SO$_2$ group;
n is an integer ranging from 0 to 10; and
L is an alkylene group having 1 to 5 carbon atoms;
at least one multifunctional aromatic (meth)acrylate monomer of general Formula IV:

$$H_2C=CR2\text{-}(CO)\text{---}O\text{---}W\text{---}O\text{---}(CO)\text{---}R2C=CH_2 \qquad \text{Formula IV}$$

where R2 is hydrogen or methyl,
(CO) is a carbonyl group C=O, and
W is a divalent group comprising a heteroaromatic group, a fused aromatic group, or a group containing both heteroalkylene and aromatic groups; and
at least on initiator; and
surface treated metal oxide nanoparticles, wherein the surface treated metal oxide nanoparticles comprise metal oxide nanoparticles that have been surface treated with a mixture of at least two silane-functional surface treatment agents;
wherein the curable ink composition is inkjet printable, having a viscosity of 30 centipoise or less at a temperature of from room temperature to 60° C., and is free from solvents, and wherein the curable ink composition when printed and cured has a refractive index of 1.55 or greater, and is optically clear.

2. The curable ink composition of claim 1, wherein the metal oxide nanoparticles comprise titania nanoparticles.

3. The curable ink composition of claim 1, wherein the at least two silane-functional surface treatment agents comprise at least one aromatic-containing silane-functional surface treatment agent with the general Formula I:

$$(R^a)_{3-d}(R^bO)_d\text{---Si-A-Y} \qquad \text{I}$$

wherein each $R^a$ independently comprises an alkyl group with 1-5 carbon atoms;
each $R^b$ independently comprises an alkyl group with 1-3 carbon atoms;
d is an integer of 1-3;
A is a divalent linking group containing 1-5 carbon atoms; and
Y is an aromatic-containing group;
and at least one silane-functional surface treatment agent comprising a co-polymerizable group with the general Formula II:

$$(R^a)_3d(R^bO)_d\text{---Si---B---Z} \qquad \text{II}$$

wherein each $R^a$ independently comprises an alkyl group with 1-5 carbon atoms;
each $R^b$ independently comprises an alkyl group with 1-3 carbon atoms;
d is an integer of 1-3;
B is a divalent linking group containing at least 3 carbon atoms; and
Z is an ethylenically unsaturated functional group.

4. The curable ink composition of claim 3, wherein the silane-functional surface treatment agent of general Formula I comprises:

$$(R^a)_{3-d}(R^bO)_d\text{---Si-A-Y} \qquad \text{I}$$

wherein each $R^a$ independently comprises an alkyl group with 1-5 carbon atoms;

each $R^b$ independently comprises an alkyl group with 1-3 carbon atoms;
d is an integer of 1-3;
A is a divalent hydrocarbon linking group of —(CH$_2$)—$_a$ where a is an integer of 1-5; a divalent aromatic-containing linking group; or a hydrocarbon linking group substituted with one or more heteroatoms; and
Y is an aromatic-containing group of Ar; —O—Ar; —O—(CO)—Ar; or —(CO)—Ar
wherein each Ar is an aryl group; and (CO) is a carbonyl group C=O.

5. The curable ink composition of claim 4, wherein the silane-functional surface treatment agent of general Formula I comprises:

$$(R^a)_{3-d}(R^bO)_d\text{---Si-A-Y} \qquad \text{I}$$

each $R^b$ independently comprises an alkyl group with 1-2 carbon atoms;
d is 3;
A is a divalent hydrocarbon linking group of —(CH$_2$)—$_a$ where a is an integer of 1-5; and
Y is phenyl; substituted phenyl; biphenyl, substituted biphenyl; —O-Ph;
—O—(CO)-Ph; or —(CO)-Ph wherein each Ph is a phenyl or substituted phenyl group;
and (CO) is a carbonyl group C=O.

6. The curable ink composition of claim 3, wherein the at least one silane-functional surface treatment agent comprising a co-polymerizable group with the general Formula II:

$$(R^a)_3d(R^bO)_d\text{---Si---B---Z} \qquad \text{II}$$

wherein each $R^a$ independently comprises an alkyl group with 1-5 carbon atoms;
each $R^b$ independently comprises an alkyl group with 1-3 carbon atoms;
d is an integer of 1-3;
B is a divalent hydrocarbon linking group of —(CH$_2$)—$_b$ where b is an integer of 3-10; and
Z is an ethylenically unsaturated functional group comprising —O—(CO)—C(R2)=CH$_2$, where (CO) is a carbonyl group C=O, and R2 is a hydrogen atom or a methyl group.

7. The curable ink composition of claim 3, wherein the molar ratio of aromatic-containing silane-functional surface treatment agent to silane-functional surface treatment agent comprising a co-polymerizable group is in the range of 30:70 to 5:95.

8. The curable ink composition of claim 1, wherein the curable ink composition comprises at least 2% by weight of surface treated metal oxide nanoparticles.

9. A method of preparing an article comprising:
providing a substrate with a first major surface and a second major surface;
providing a curable ink composition wherein the curable ink composition comprises:
a curable aromatic monomer composition, wherein the curable monomer composition comprises:
at least one aromatic (meth)acrylate compound of Formula III:

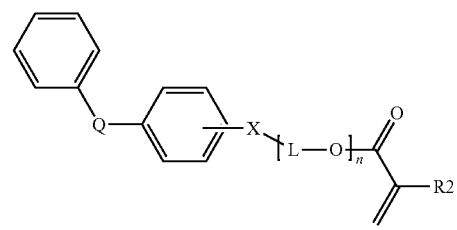

Formula III wherein R2 is H or CH$_3$;

X is linked to the aromatic group at either the ortho, para, or meta position and is O, S, or a single bond;

Q is a single bond, O, S, SiR$_2$ where R is an alkyl group, a carbonyl group (C=O), an amino group NR where R is hydrogen or an alkyl, or an SO$_2$ group;

n is an integer ranging from 0 to 10; and

L is an alkylene group having 1 to 5 carbon atoms;

at least one multifunctional aromatic (meth)acrylate monomer of general Formula IV:

Formula IV where R2 is hydrogen or methyl, (CO) is a carbonyl group C=O, and

W is a divalent group comprising a heteroaromatic group, a fused aromatic group, or a group containing both heteroalkylene and aromatic groups; and at least on initiator; and surface treated metal oxide nanoparticles, wherein the surface treated metal oxide nanoparticles comprise metal oxide nanoparticles that have been surface treated with a mixture of at least two silane-functional surface treatment agents;

wherein the curable ink composition is inkjet printable, having a viscosity of 30 centipoise or less at a temperature of from room temperature to 60° C., and is free from solvents, and wherein the curable ink composition when printed and cured has a refractive index of 1.55 or greater, and is optically clear;

disposing the curable ink composition on at least a portion of the second major surface of the substrate to form a curable layer;

curing the curable layer to form a cured layer; and depositing an inorganic barrier layer on the cured layer.

* * * * *

UNITED STATES PATENT AND TRADEMARK OFFICE
CERTIFICATE OF CORRECTION

| | |
|---|---|
| PATENT NO. | : 11,667,803 B2 |
| APPLICATION NO. | : 16/631201 |
| DATED | : June 6, 2023 |
| INVENTOR(S) | : Evan L Schwartz |

It is certified that error appears in the above-identified patent and that said Letters Patent is hereby corrected as shown below:

In the Claims

<u>Column 39</u>
Line 51, In Claim 3, delete "$(R^a)_3{}^d(R^bO)_d\text{-Si-B-Z}$" and insert -- $(R^a)_{3-d}(R^bO)_d\text{-Si-B-Z}$ --, therefor.

<u>Column 40</u>
Line 28, In Claim 6, delete "$(R^a)_3{}^d(R^bO)_d\text{-Si-B-Z}$" and insert -- $(R^a)_{3-d}(R^bO)_d\text{-Si-B-Z}$ --, therefor.

Signed and Sealed this
Seventh Day of November, 2023

Katherine Kelly Vidal
*Director of the United States Patent and Trademark Office*